United States Patent
Ji et al.

(10) Patent No.: US 11,218,285 B2
(45) Date of Patent: Jan. 4, 2022

(54) METHOD AND APPARATUS FOR PERFORMING CHANNEL MULTIPLEXING FOR MILLIMETER WIRELESS COMMUNICATION

(71) Applicant: Samsung Electronics Co., Ltd., Suwon-si (KR)

(72) Inventors: Hyoungju Ji, Suwon-si (KR); Taehyoung Kim, Suwon-si (KR); Heecheol Yang, Suwon-si (KR); Younsun Kim, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 16/834,884

(22) Filed: Mar. 30, 2020

(65) Prior Publication Data

US 2020/0313835 A1    Oct. 1, 2020

(30) Foreign Application Priority Data

Mar. 29, 2019  (KR) .................. 10-2019-0036874
May 16, 2019   (KR) .................. 10-2019-0057734

(51) Int. Cl.
*H04L 5/02* (2006.01)
*H04L 5/00* (2006.01)

(52) U.S. Cl.
CPC ............ *H04L 5/023* (2013.01); *H04L 5/0007* (2013.01); *H04L 5/0044* (2013.01); *H04L 5/0048* (2013.01)

(58) Field of Classification Search
CPC ............ H04W 72/0453; H04W 72/043; H04L 27/2604; H04L 27/262
See application file for complete search history.

(56) References Cited

U.S. PATENT DOCUMENTS

2011/0038346 A1   2/2011   Yokomokora et al.
2016/0112965 A1   4/2016   Damnjanovic et al.
(Continued)

FOREIGN PATENT DOCUMENTS

WO   2018228789 A1   12/2018
WO   2018234366 A1   12/2018

OTHER PUBLICATIONS

International Search Report and Written Opinion of the International Searching Authority in connection with International Application No. PCT/KR2020/004355 dated Jul. 6, 2020, 9 pages.

*Primary Examiner* — Kevin Kim

(57) ABSTRACT

Disclosed are a communication scheme and a system thereof for converging an IoT technology and a 5G communication system for supporting a high data transmission rate beyond that of a 4G system. The disclosure can be applied to intelligent services (for example, services related to a smart home, smart building, smart city, smart car, connected car, health care, digital education, retail business, security, and safety) based on the 5G communication technology and the IoT-related technology. A method of receiving a synchronization signal block (SSB) by a UE in a wireless communication system may include: identifying whether a bandwidth of a cell transmitting an SSB which the UE desires to receive corresponds to a first frequency band (FR); when the bandwidth of the cell corresponds to the first frequency band, receiving the SSB using a single carrier waveform; and acquiring synchronization, based on the received SSB; and acquiring system information.

20 Claims, 32 Drawing Sheets

(56) References Cited

U.S. PATENT DOCUMENTS

| | | |
|---|---|---|
| 2018/0092056 A1 | 3/2018 | Zeng et al. |
| 2018/0092095 A1* | 3/2018 | Zeng .................... H04L 5/0007 |
| 2018/0123747 A1 | 5/2018 | Wang et al. |
| 2018/0227866 A1 | 8/2018 | Jung et al. |
| 2018/0287840 A1* | 10/2018 | Akkarakaran ...... H04L 27/2692 |
| 2018/0376454 A1 | 12/2018 | Astrom et al. |
| 2019/0261315 A1* | 8/2019 | Zhang ............... H04W 56/0015 |
| 2020/0204423 A1 | 6/2020 | Atungsiri et al. |

* cited by examiner (a) (510)

(b) (520)

[a] (1010)

(b) [1020]

[a] (1110)

(b) (1120)

(a) (1400)

(b) [1410]

(c) [1430]

METHOD AND APPARATUS FOR PERFORMING CHANNEL MULTIPLEXING FOR MILLIMETER WIRELESS COMMUNICATION

CROSS-REFERENCE TO RELATED APPLICATIONS

This application is based on and claims priority under 35 U.S.C. 119 to Korean Patent Application Nos. 10-2019-0036874 & 10-2019-0057734, filed on Mar. 29, 2019 & May 16, 2019, in the Korean Intellectual Property Office, the disclosure of which is herein incorporated by reference in their entireties.

BACKGROUND

1. Field

The disclosure relates to a method and an apparatus for communication between a Base Station (BS) and a User Equipment (UE) in a millimeter-wave wireless communication system and, particularly to, a method and an apparatus for multiplexing a synchronization signal and a signal for system information to a plurality of UEs through a single carrier to transmit the signals by the BS. Further, the disclosure relates to a method and an apparatus for multiplexing a synchronization signal, a signal for system information, and a data channel signal for scheduling through a single carrier to transmit the signals by one BS.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In general, mobile communication systems have been developed to secure mobility of a user and provide communication. The mobile communication system has come to the stage of providing a high-speed data communication service as well as voice communication on the strength of rapid progress of technologies. Recently, a new radio (NR) system is being standardized by $3^{rd}$ generation partnership project (3GPP) as one of next-generation mobile communication systems. The NR system is developed to satisfy various network requirements and achieve an extensive performance goal, which is a technology for implementing communication in a millimeter wave band. Hereinafter, the NR system may be understood to include a 4G LTE system, an LTE-A system, and a 5G NR system supporting a microwave as well as communication in a millimeter wave band higher than or equal to 6 GHz.

The above information is presented as background information only to assist with an understanding of the disclosure. No determination has been made, and no assertion is made, as to whether any of the above might be applicable as prior art with regard to the disclosure.

SUMMARY

When a BS transmits data to a UE through a single carrier in a millimeter wave (mmWave) higher than or equal to 6 GHz in which the NR system can be supported, signal transmission using high power is required to overcome high path loss and signal attenuation. In this case, the BS has difficulty in using a multi-carrier transmission technology, and thus the disclosure proposes a method and an apparatus for effectively transmitting and receiving a synchronization signal and a broadcast signal that carries system information through a single carrier in a millimeter wave band.

According to the disclosure to solve the above-described problem, the BS may acquire a broadcast signal on the basis of a frequency band, subcarrier spacing, a single carrier bandwidth for an SSB, and the size thereof, and identify channel bandwidth information through the acquired broadcast signal on the basis of one or more codepoints of system information. The BS according to an embodiment of the disclosure may transmit a synchronization signal by selectively using different carrier waveforms (CP-OFDM, single carrier (SC) waveform) to transmit system information.

A method by which a BS multiplexes a channel through a single carrier in a downlink includes a step of configuring a signal by selecting a waveform of a synchronization signal from one or more waveforms, a step of configuring information (channel bandwidth) configured by the BS as system information, a step of configuring a broadcast signal to transmit system information and placing the broadcast signal in time and frequency resources, a step of determining a waveform of the broadcast signal on the basis of waveform information of the synchronization signal and generating a signal, and a step of generating a signal of a control channel and data channel resource region on the basis of the system information. A method by which a UE receives an SSB using a single carrier includes a step of reconstructing a synchronization signal through one or more waveforms, a step of reconstructing a broadcast signal on the basis of reconstructed waveform information, a step of identifying system information in the reconstructed broadcast signal, and a step of identifying channel bandwidth information and data reception resource allocation information in the system information.

A BS multiplexing a channel in a millimeter wave wireless communication system according to the disclosure includes a transmitter and a controller configured to control the transmitter. A UE receiving a synchronization signal, a broadcast signal, and a data channel using a single carrier signal in a millimeter wave wireless communication system includes a receiver and a controller configured to control the receiver.

In accordance with an aspect of the disclosure, a method of transmitting a synchronization signal block (SSB) by a BS in a wireless communication system is provided. The method includes: identifying whether a bandwidth of a cell controlled by the BS corresponds to a first frequency band (frequency range (FR)); and when the bandwidth of the cell corresponds to the first frequency band, transmitting the SSB using a single carrier waveform, wherein the SSB includes a primary synchronization signal (PSS), a secondary synchronization signal (SSS), and a physical broadcast channel (PBCH) for transmitting system information.

The transmitting of the SSB using the single carrier waveform may include: transmitting the PSS and the SSS using the single carrier waveform in a first bandwidth; and transmitting the system information using the single carrier waveform through the PBCH in a second bandwidth. The transmitting of the SSB using the single carrier waveform may include: transmitting the PSS using a multi-carrier waveform in a first bandwidth; transmitting the SSS using the single carrier waveform in the first bandwidth; and transmitting the system information using the single carrier waveform through the PBCH in a second bandwidth. The transmitting of the SSB using the single carrier waveform may include: transmitting the PSS and the SSS using a multi-carrier waveform in a first bandwidth; and transmitting the system information using the single carrier waveform through the PBCH in a second bandwidth.

The method may further include: transmitting downlink control information (DCI) for scheduling additional system information through a physical downlink control channel (PDCCH) in a frequency band in which the PBCH is not transmitted in a symbol to which the PBCH is mapped; and transmitting additional system information scheduled by the DCI through a physical downlink shared channel (PDSCH) in a frequency band in which the PBCH is not transmitted in another symbol to which the PBCH is mapped.

In accordance with another aspect of the disclosure, a method of receiving a synchronization signal block (SSB) by a UE in a wireless communication system is provided. The method includes: identifying whether a bandwidth of a cell transmitting an SSB which the UE desires to receive corresponds to a first frequency band (frequency range (FR)); when the bandwidth of the cell corresponds to the first frequency band, receiving the SSB using a single carrier waveform; and acquiring synchronization, based on the received SSB and acquiring system information, wherein the SSB includes a primary synchronization signal (PSS), a secondary synchronization signal (SSS), and a physical broadcast channel (PBCH) for receiving system information.

In accordance with another aspect of the disclosure, a BS for transmitting a synchronization signal block (SSB) in a wireless communication system is provided. The BS includes: a transceiver; and a controller connected to the transceiver and configured to perform control to identify whether a bandwidth of a cell controlled by the BS corresponds to a first frequency band (frequency range (FR)) and, when the bandwidth of the cell corresponds to the first frequency band, transmit the SSB using a single carrier waveform, wherein the SSB includes a primary synchronization signal (PSS), a secondary synchronization signal (SSS), and a physical broadcast channel (PBCH) for transmitting system information.

In accordance with another aspect of the disclosure, a UE for receiving a synchronization signal block (SSB) in a wireless communication system is provided. The UE includes: a transceiver; and a controller connected to the transceiver and configured to perform control to identify whether a bandwidth of a cell transmitting an SSB which the UE desires to receive corresponds to a first frequency band (frequency range (FR)), when the bandwidth of the cell corresponds to the first frequency band, receive the SSB using a single carrier waveform, and acquire synchronization, based on the received SSB and acquire system information, wherein the SSB includes a primary synchronization signal (PSS), a secondary synchronization signal (SSS), and a physical broadcast channel (PBCH) for transmitting system information.

According to an embodiment of the disclosure, the BS can efficiently multiplex and transmit a synchronization signal, a broadcast signal, or a control channel and a data channel for data scheduling through a single carrier in a frequency and accordingly increase the coverage. The synchronization signal and the broadcast signal are allocated to and transmitted in different bands, and thus time overhead used for transmitting a synchronization signal block (SSB) can be decreased.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1A:
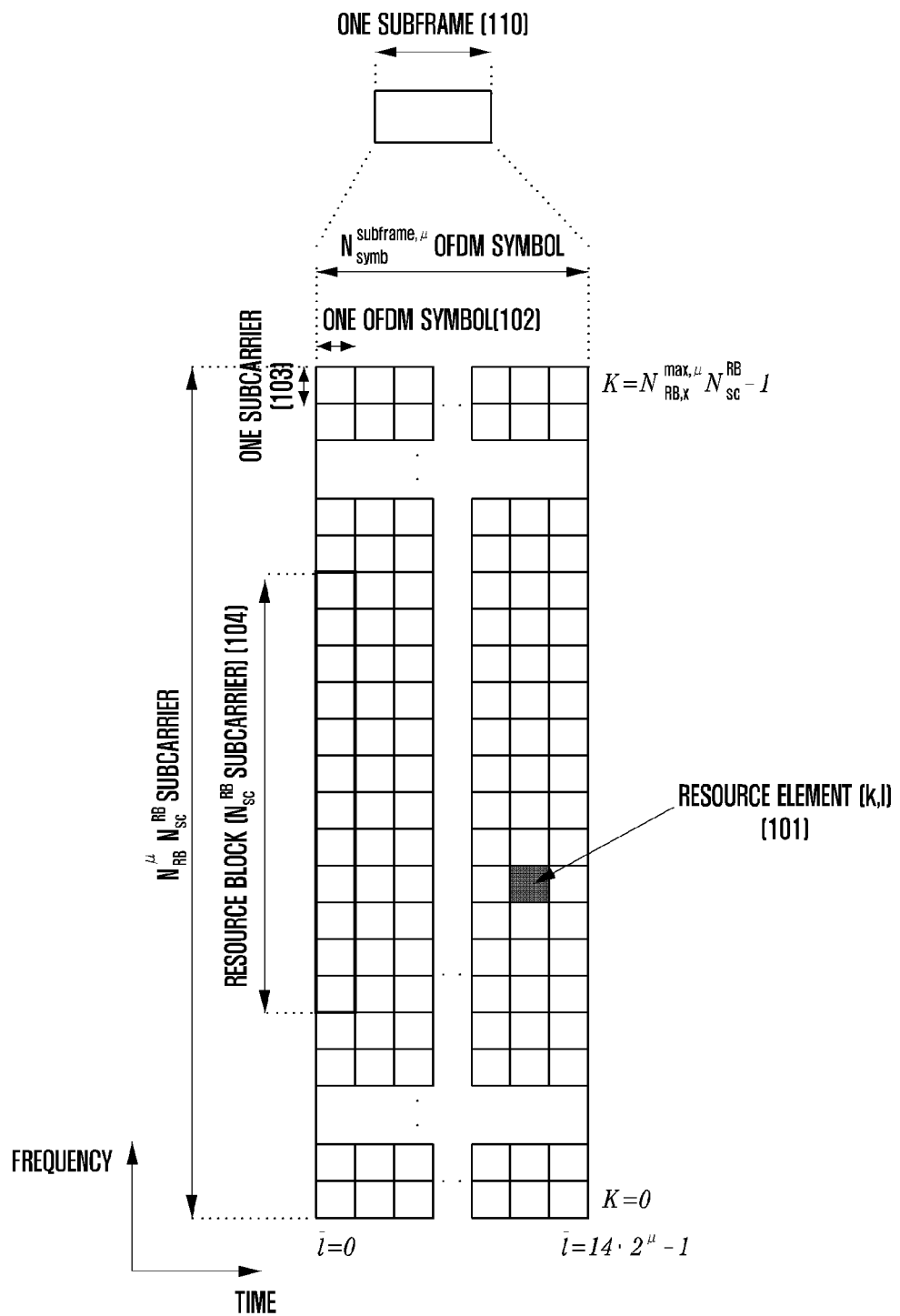
FIG. 1A illustrates the structure of a time-frequency domain that is an NR system resource region.

FIGS. 1A through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the disclosure below, an uplink (UP) refers to a radio link through which a terminal (user equipment (UE) or mobile station (MS)) transmits data or a control signal to a base station (eNode B, gNB, or BS), and a downlink (DL) refers to a radio link through which the BS transmits data or a control signal to the UE. A $5^{th}$ generation communication system (or a 5G system or a new radio (NR) system) is a communication system after a $4^{th}$ generation communication system (a 4G system, for example, long term evolution (LTE) or evolved universal terrestrial radio access (E-UTRA)), and has been developed to freely reflect various requirements of users and service providers. Services considered for the 5G communication system may include enhanced mobile broadband (eMBB) communication aiming at high-speed transmission of high-capacity data, massive machine type communication (mMTC) for minimization of UE power and access of a plurality of UEs, and ultra reliability low latency communication (URLLC) aiming at high reliability and low latency. Different requirements may be applied according to the type of service applied to the UE.

Embodiments of the disclosure are for a communication system in which a BS in an NR system transmits a downlink signal to a UE. An NR downlink signal includes a data channel for transmitting data information, a control channel for transmitting control information, and a reference signal (RS) for channel measurement and channel feedback.

Specifically, an NR BS transmits data and control information to the UE through a physical downlink shared channel (PDSCH) and a physical downlink control channel (PDCCH), respectively. The NR BS may have a plurality of reference signals, and the plurality of reference signals may include one or more of a channel state information RS (CSI-RS) and a demodulation RS or UE-specific RS (DMRS). The NR BS may transmit a UE-specific reference signal (DMRS) only in a region scheduled to transmit data and transmit a CSI-RS in time and frequency axis resources in order to acquire channel information for data transmission. Transmission and reception of a data channel may be understood as transmission and reception of data on the data channel, and transmission and reception of a control channel may be understood as transmission and reception of control information on the control channel.

In the wireless communication system, communication between the BS and the UE is deeply influenced by a propagation environment. Particularly, in a band of 60 GHz, attenuation of a signal due to water and oxygen in the atmosphere is very large, and it is difficult to transmit a signal by a small scattering effect due to the length of a small wavelength. Accordingly, the BS can secure coverage only when a signal is transmitted with higher power. When a signal is transmitted using high transmission power, it is difficult to use a multi-carrier transmission technology having the excellent performance to overcome a multi-path delay effect in the 4G system because of a high peak to average power ratio (PAPR). However, single-carrier transmission is performed to use higher transmission power, there is a problem in that it is difficult to perform user multiplexing, and channel estimation and channel estimation performance of a multi-path signal deteriorate. In a millimeter wave, an analog beam (hereinafter, interchangeably used with a beam, and understood as a signal having directivity in the disclosure) is used to overcome high pathloss. However, since the length of the wavelength of the millimeter wave is very short, a bandwidth of the analog beam is reduced in which case it is more difficult to support multiple users. As a result, it is difficult to guarantee the performance of a system of the millimeter wave band at a level of a technology used in a microwave band.

Accordingly, the disclosure proposes a method and an apparatus for effectively supporting user multiplexing through a single carrier of a millimeter wave band, and the method and the apparatus are related to a scenario in which the BS operates one single carrier.

FIG. 1A illustrates the structure of a time-frequency domain that is an NR system resource region.

In FIG. 1A, the horizontal axis is a time domain, and the vertical axis is a frequency domain. The basic unit of resources in the time and frequency domain is a resource element (RE) 101 and may be defined as 1 orthogonal frequency division multiplexing (OFDM) symbol 102 in the time axis and 1 subcarrier 103 in the frequency axis. In the frequency domain, $N_{sc}^{RB}$ (for example, 12) successive REs may correspond to one resource block (RB) (or physical resource block (PRB)) 104.

Figure 1B:
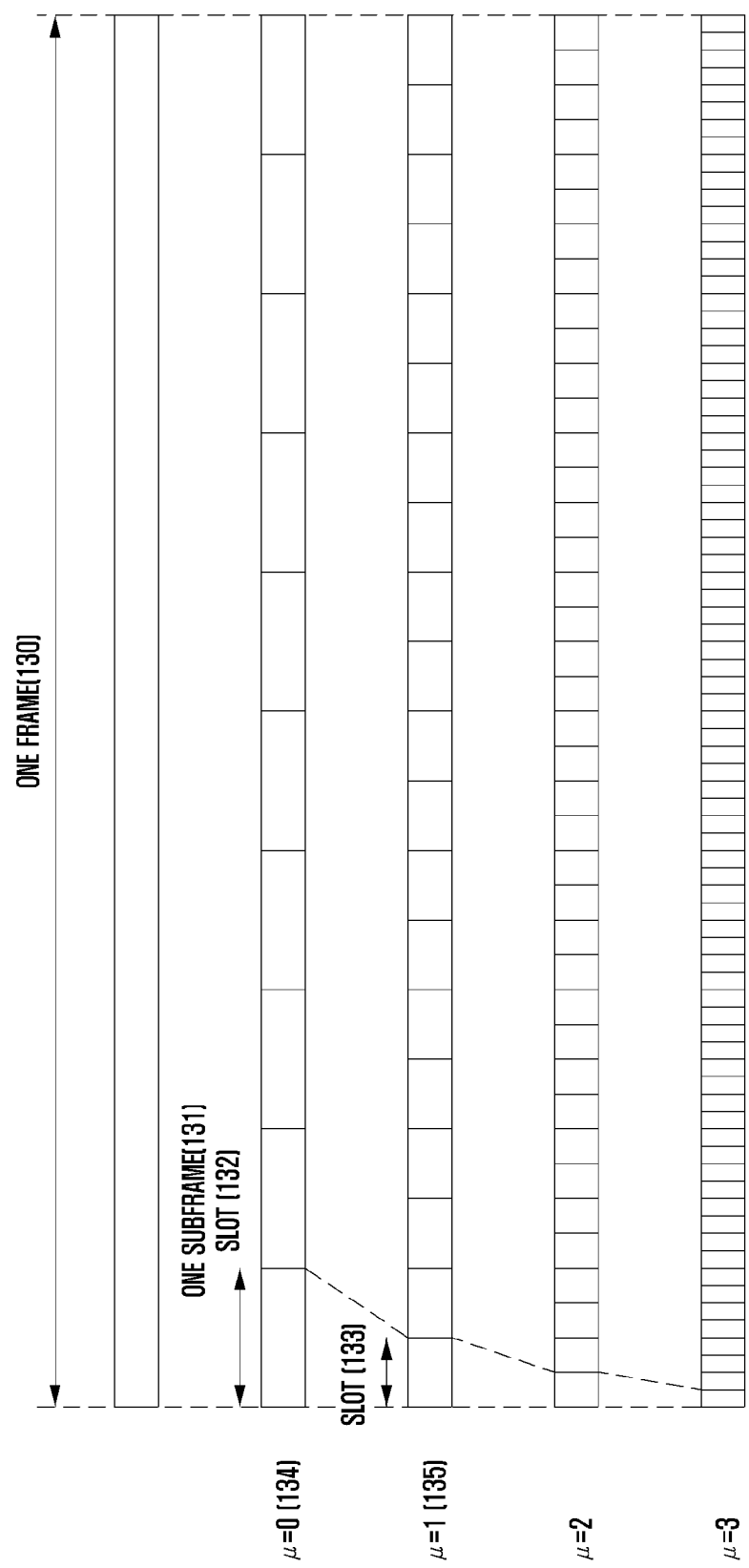
FIG. 1B illustrates a slot structure considered by the NR system.

FIG. 1B illustrates a slot structure considered by the NR system.

In FIG. 1B, an example of the structure of a frame 130, a subframe 131, and a slot 132 is illustrated. One frame 130 may be defined as 10 ms. One subframe 131 may be defined as 1 ms, and accordingly one frame 130 may consist of a total of 10 subframes 131. One slot 132 or 133 may be defined as 14 OFDM symbols (that is, the number symbols $N_{symb}^{slot}$ per slot is 14). One subframe 131 may include one or a plurality of slots 132 and 133, and the number of slot 132 or 133 per subframe 131 may vary depending on a configuration value µ 134 or 135 for subcarrier spacing. FIG. 1B illustrates the subcarrier spacing configuration value µ=0 134 and µ=1 135 by way of example. In the case of µ=0 134, one subframe 131 ma include one slot 132. In the case of µ=1 135, one subframe 131 may include two slots 133. That is, the number of slots $N_{slot}^{subframe,\mu}$ per subframe may vary depending on the configuration value µ for subcarrier spacing, and the number of slots $N_{slot}^{subframe,\mu}$ per frame may vary depending thereon. $N_{slot}^{subframe,\mu}$ and $N_{slot}^{subframe,\mu}$ depending on the subcarrier spacing configuration value µ may be defined as [Table 1] below.

TABLE 1

| µ | Sub carrier spacing (kHz) | $N_{symb}^{slot}$ | $N_{slot}^{frame,\mu}$ | $N_{slot}^{subframe,\mu}$ |
|---|---|---|---|---|
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |
| 5 | 480 | 14 | 320 | 32 |
| 6 | 960 | 14 | 640 | 64 |

Figure 1C:
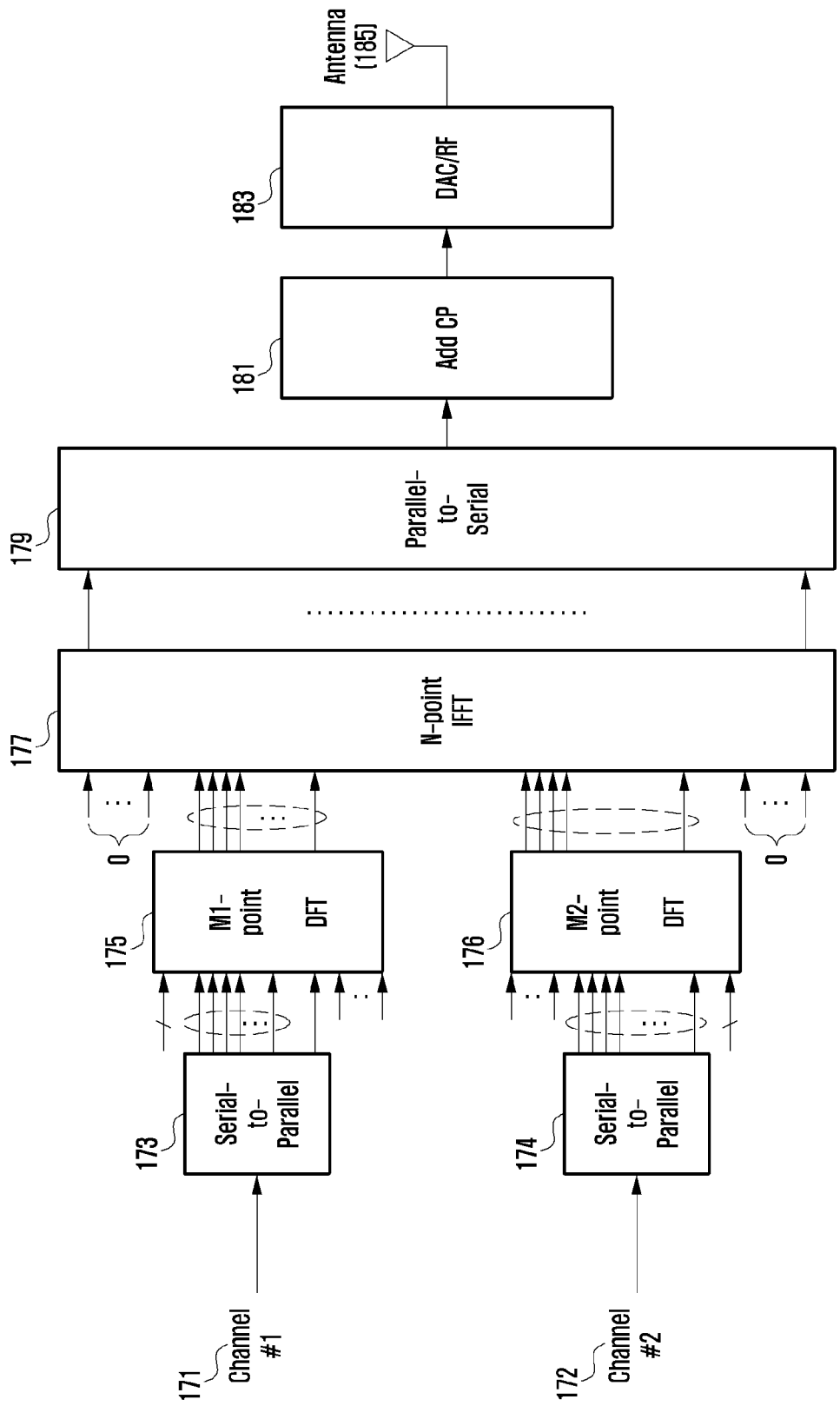
FIG. 1C illustrates a communication system in which the BS and the UE transmit and receive data to and from each other.

FIG. 1C illustrates a communication system in which the BS and the UE transmit and receive data to and from each other.

Referring to FIG. 1C, a transmitter is a system capable of performing OFDM transmission and may transmit a single carrier (SC) in a bandwidth in which the OFDM transmission is possible. The transmitter 170 may include a plurality of serial-to-parallel (S-P) converters 173 and 174, a plurality of single carrier precoders 174 and 175, an inverse fast Fourier transform (IFFT) unit 177, a parallel-to-serial (P-S) converter 179, a cyclic prefix (CP) inserter 181, an analog signal unit 183 (including a digital-to-analog converter and an RF), and an antenna module 185.

First data 171 passing through channel coding and modulation is converted to a parallel signal by the serial-to-parallel converter 173, mapped to the SC precoder 175 according to an occupied bandwidth, and converted to a single carrier waveform (SCW) through the SC precoder 175. Also, second data 172 passing through channel coding and modulation is converted to a parallel signal by the serial-to-parallel converter 174, mapped to the SC precoder 176 according to an occupied bandwidth, and converted to a single carrier waveform (SCW) through the SC precoder 176. At this time, the first data 171 and the second data 172 may be data transmitted through different channels, data and signals transmitted through channels, different signals, data transmitted in the same channel, or the same signals.

The device 175 for converting the parallel signal to the SCW may be implemented through various methods including, for example, a method using a discrete Fourier transform (DFT) precoder, a method using up-converting, and a method using code-spreading. The disclosure may include various precoding methods. Although the specification is described on the basis of an SCW generation method using a DFT precoder for understanding of the disclosure, embodiments of the disclosure may be equally used for the case in which the SCW is generated through another method.

At this time, the size of the DTF 175 is M1 and the size of the DFT 176 is M2, and a data signal passing through the DFT precoder 175 (or a DFT filter) having the length of M1 and a data signal passing through the DFT precoder 176 having the length of M2 are converted to broadband frequency signals through an N-point IFFT unit 177. Although the N-point IFFT processor processes transmission of parallel signals through respective subcarriers of channel bandwidths split into N subcarriers, DFT precoding is performed before the N-point IFFT processor in FIG. 1C, and thus a signal transmitted after IFFT is transmitted using one single-carrier. The N-point IFFT-processed signal (data) is stored as N samples via a process of the parallel-to-serial converter 179, and some of the N stored samples, which are in a back part, are copied and concatenated with a front part. Such a process is performed by the CP inserter 181.

Thereafter, the signal is transmitted to the analog signal unit 183 via a pulse shaping filter such as a raised cosine filter and converted to an analog signal via a digital-to-analog conversion process such as a power amplifier (PA), and the converted analog signal is transmitted to the antenna module 185 and radiated to the air.

A general SCW signal may be transmitted while M precoded signals are mapped to M successive subcarriers, and such a processor may be performed by the IFFT unit 177. Accordingly, M is determined according to the size of transmitted data or the number of time symbols used by transmitted data. In general, M is much smaller than N, which is because the SCW corresponds to a signal having a small peak-to-average power ratio (PAPR) due to a characteristic thereof.

The PAPR is a degree of a change in transmission power of a sample of the transmitted signal. The large PAPR means that a dynamic range of the PA of the transmitter is large, which means that a power margin required for operating the PA is large. In this case, the transmitter configures a margin of the available PA to be high in case of a great change, and accordingly, maximum power which can be used by the transmitter is reduced. As a result, a maximum communication range between the transmitter and the receiver is reduced. On the other hand, in the case of the SCW having a small PAPR, a change in the PA is very small, and thus the PA can be operated even though the margin is configured to be small. Accordingly, the maximum communication range is increased.

Since propagation attenuation is high in the mmWave wireless communication system, it is important to guarantee a communication range, and thus the BS is advantageous to use a technology of increasing the maximum communication range like the SCW. In general, the SCW has a margin that is 5 to 6 dB higher than a multi-carrier waveform (MCW), and accordingly, an SCW transmitter uses higher transmission power than the MCW and thus the communication range may increase. The SCW illustrated in FIG. 1C is used by the UE having the small upper limit of maximum transmission power like the uplink, and particularly, is used for uplink transmission of the LTE system. Particularly, since the upper limit of maximum transmission power is not large, the UE cannot configure the size of M to be large due to lack of uplink transmission power. Further, as transmission power is lower, M is further reduced, and thus a communication range cannot be guaranteed.

Since the BS receives a signal transmitted by one UE in the uplink, there is no need to consider the case in which one or more UEs transmit signals through the same single carrier. On the other hand, in the case of a millimeter wave wireless system, power shortage may be generated in the downlink due to propagation attenuation. In the case of downlink transmission, it is necessary for the BS to simultaneously transmit signals to one or more UEs, so that supporting thereof is required.

Prior to the following description, for frequency regions (FRs) supported by 5G NR, a frequency region equal to or lower than 6 GHz is referred to as FR1, a frequency region higher than or equal to 6 GHz and equal to or lower than 24 GHz is referred to as FR3, a frequency region higher than or equal to 24 GHz and equal to or lower than 52.6 GHz is referred to FR2, and a frequency region higher than or equal to 52.6 GHz and equal to or lower than 114.6 GHz is referred to as FR4. The disclosure assumes that a first waveform is cyclic prefix-orthogonal frequency division multiplexing (CP-OFDM) and a second waveform is a single-carrier waveform. The disclosure can be applied to all single-carrier waveforms, but a DFT spread OFDM (DFT-s-OFDM) waveform is assumed and described for convenience of description. This is because the same description for resource allocation of CP-OFDM can be applied to DFT-s-OFDM.

In the disclosure, a first synchronization signal is a primary synchronization signal (PSS) or a signal corresponding to a function thereof, and a second synchronization signal is a secondary synchronization signal (SSS) or a signal corresponding to a function thereof. A third synchronization signal is a signal having the same function as the first synchronization signal but having different waveform and resource allocation, and a fourth synchronization signal is a signal having the same function as the second synchronization signal but having different waveform and resource allocation. Hereinafter, a DMRS for receiving a PBCH is transmitted temporally earlier than the PBCH. If description is not required, the content of DMRS transmission may be omitted, or a broadcast signal may include both a PBCH channel for initial access system information and a DMRS for reconstructing the same. A control channel (PDCCH) for transmitting downlink control information (DCI) for system information transmission and a data channel (PDSCH) for transmitting system information may be multiplexed with the broadcast signal in a method that is the same as the method of transmitting the broadcast signal (PBCH).

Subsequently, a synchronization signal (SS)/physical broadcast channel (PBCH) block (interchangeably used with a synchronization signal block (SSB)) in the 5G system will be described. The SS/PBCH block is a physical layer channel block including a primary SS (PSS), a secondary SS (SSS), and a PBCH. One or more of a plurality of SS/PBCH blocks may be transmitted within a time of 5 ms, and each of the transmitted SS/PBCH blocks may be distinguished by indexes. Specifically, the SS/PBCH block includes the following signals and channels.

PSS: denotes a signal that is a criterion of downlink time and frequency synchronization and provides some information of a cell ID.

SSS: denotes a signal that is a criterion of downlink time and frequency synchronization and provides information on the remaining cell IDs that are not provided by the PSS. Additionally, the SSS may serve as a reference signal for demodulating a PBCH.

PBCH: a master information block (MIB) transmitted through the PBCH provides necessary system information required for transmitting and receiving a data channel and a control channel by the UE (PBCH may be interchangeably used with the broadcast signal). The necessary system information may include search space-related control information indicating radio resource mapping information of a control channel and scheduling control information of a separate data channel for transmitting system information. Specifically, information included in the MIB includes a most significant bit (MSB) of an SS/PBCH block index, a half frame timing indicator, system frame number information, system information block (SIB) 1,subcarrier spacing (SCS) information used for initial access, SSB subcarrier offset information, DMRS location information for a PDSCH, control region (control resource set (CORESET)) configuration information for transmitting DCI scheduling SIB1, and search space configuration information. The control region configured by control region configuration information included in the MIB may be referred to as control region #0.

The UE may detect the PSS and the SSS in an initial access stage and decode the PBCH. The UE may acquire the MIB from the PBCH and receive a configuration of control region #0 therefrom. The UE monitors control region #0 on the basis of the control region configuration information and the search space configuration information, and receives system information (SIB1) scheduled by downlink control information (DCI) transmitted in control region #0.

The UE may acquire configuration information related to a random access channel (RACH) required for initial access from the received system information. The UE may transmit a random access (RA) preamble to the BS in consideration of the SS/PBCH index selected by the UE, and the BS receiving the RA preamble may acquire information on the SS/PSBH block index selected by the UE from the BS receiving the RA preamble. Through the process, the BS may know which block was selected from the SS/PBCH blocks by the UE and that the UE monitored control region #0 associated therewith.

Figure 2A:
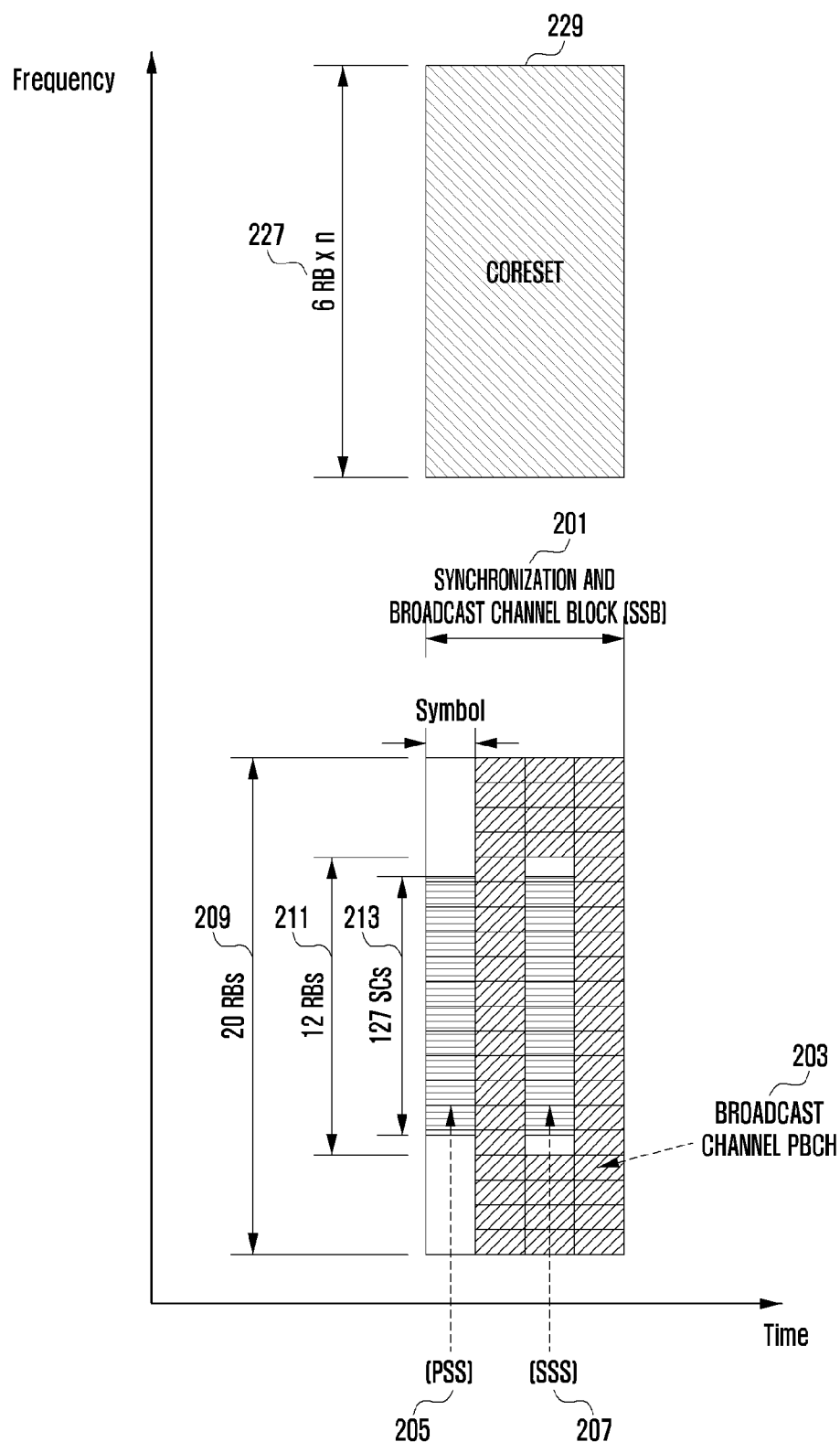
FIG. 2A illustrates a downlink SS and PBCH transmission method to which the disclosure is applied.

FIG. 2A illustrates a downlink SS and PBCH transmission method to which the disclosure is applied. Referring to FIG. 2A, an SSB includes an SS and a PBCH 203, and the SS is divided into a PSS 205 and an SSS 207. The SSB occupies four symbols 201, and a frequency band occupied by the PSS 205 and the SSS 207 has the size of 12 RBs indicated by reference numeral 211. Actually, 127 subcarriers 213 are occupied. On the other hand, the PBCH occupies a total of 20 RBs indicated by reference numeral 209. In the case of the PSS, there are unoccupied parts on both sides of the 127 subcarriers. In the case of the SSS, the PBCH occupies some parts on both sides of the 127 subcarriers. Unused power of unoccupied resources may be used for power boosting of the PSS and the SSS. An unused region between the SSS and the PBCH is for a reserved interval to which reception filters of the PSS and the SS are applied. Control region #0 is a control channel region 229 (CORESET) for transmitting scheduling information to the UE and is allocated with the size 227 of a multiple of 6 RBs in advance to a time symbol in which the SSB is transmitted. CORESET allocation information is transmitted through the PBCH. Since the CORESET and the SSB are transmitted through the same symbol, it is assumed that simultaneously transmitted two regions are transmitted using the same beam.

Figure 2B:
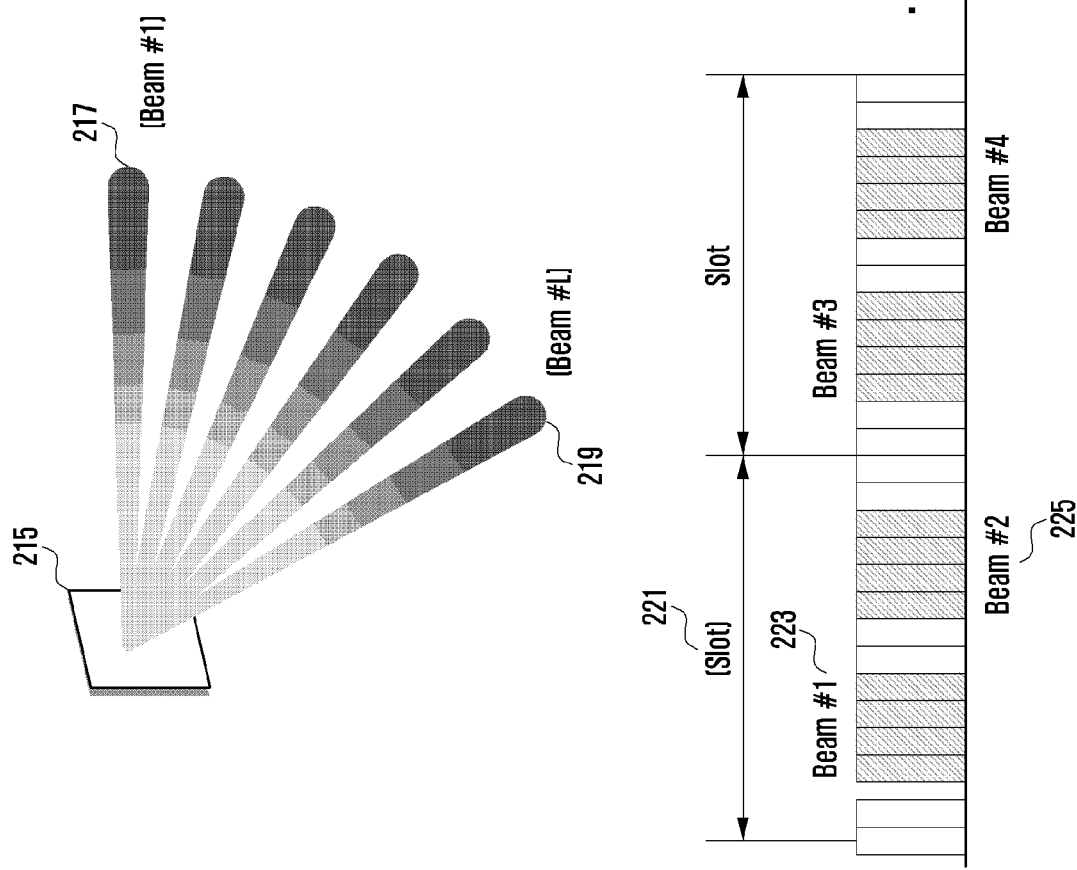
FIG. 2B illustrates an example in which the BS transmits the SSB.

FIG. 2B illustrates an example in which the BS transmits the SSB. The most noticeable characteristic of the NR SSB is that one BS 215 uses one or more beams 217 and 219, which is to compensate for radio signal attenuation. If the BS uses L beams, one cell transmits L SSBs in different time symbols as indicated by reference numerals 223 and 225, and SSBs transmitted by one BS are transmitted using the same BS ID but different unique SSB IDs (or SS/PBCH block indexes).

Figure 3:
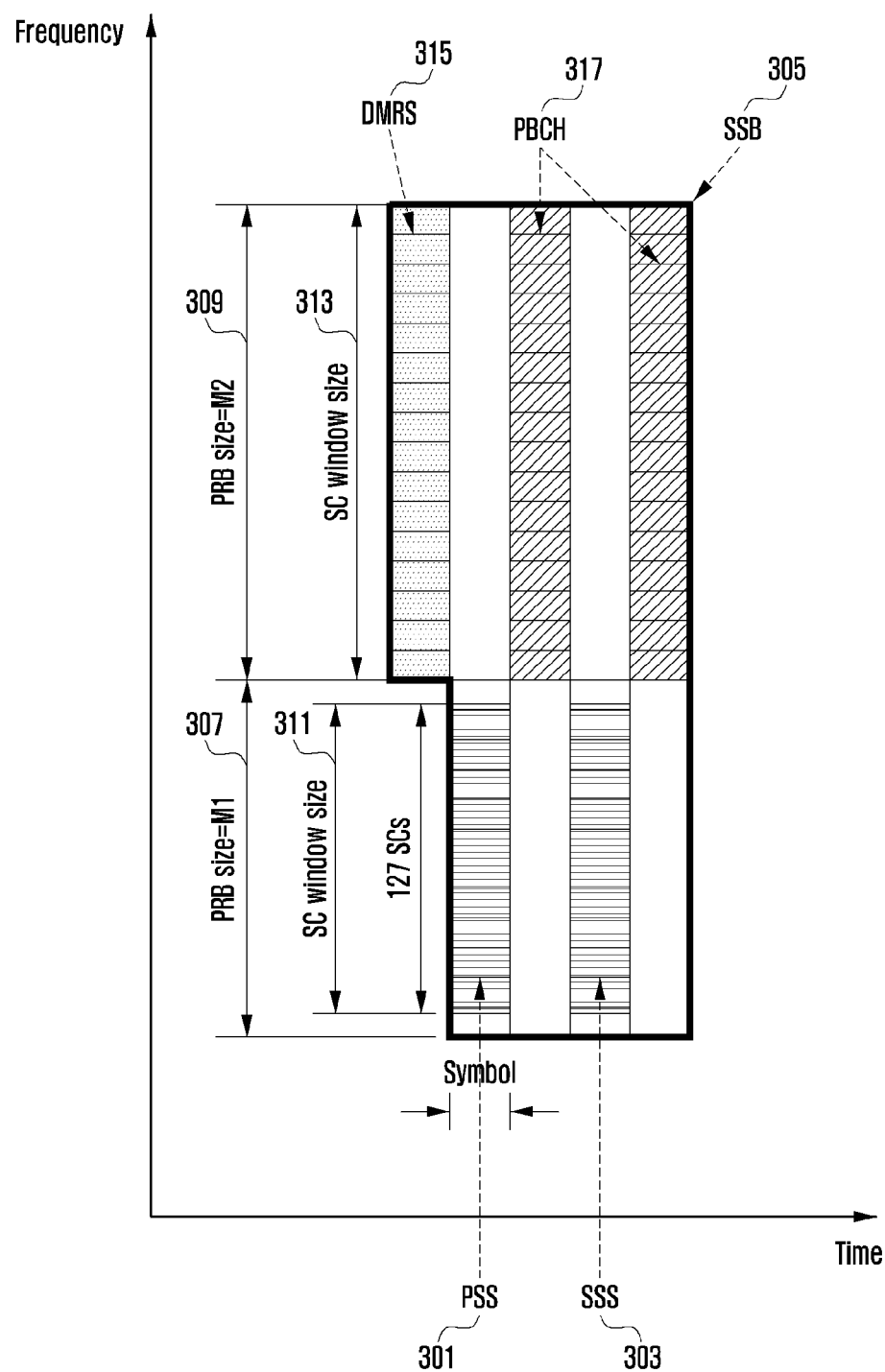
FIG. 3 illustrates a channel multiplexing method according to a first embodiment proposed by the disclosure.

FIG. 3 illustrates a channel multiplexing method according to a first embodiment proposed by the disclosure. According to the first embodiment, the BS may transmit first and second synchronization signals through time and frequency resources different from a broadcast signal, and the size of a single carrier bandwidth of the synchronization signal may be different from the size of a single carrier bandwidth of the broadcast signal. The UE searches for cells of FRs 1, 2, and 3, uses a first waveform to receive a broadcast signal, and receives and reconstructs first and second synchronization signals and the broadcast signal, and searches for a cell of FR4, assumes that a second waveform is used to receive a broadcast signal, and receives and reconstructs first and second synchronization signals and the broadcast signal.

Referring to FIG. 3, a first synchronization signal 301 and a second synchronization signal 303 included in an SSB 305 are transmitted in a band 307 occupying the PRB size M1, and a bandwidth of the second waveform (that is, a single carrier) is the same as the size of the product of the sequence length of the signals 301 and 303 and the applied SCS as indicated by reference numeral 311. On the other hand, the broadcast signal includes a reference signal (DMRS) 315 for reconstructing the broadcast signal and a broadcast signal transmission symbol 317, and a time symbol and a bandwidth occupied by the signals 301 and 303 may be different from a time symbol and a bandwidth occupied by the signals 315 and 317. The bandwidth occupied by the signals 315 and 317 has the PRB size M2 309, and M2 that is the size of the bandwidth of the second waveform for transmitting the signals 315 and 317 may be configured regardless of M1. At this time, in the time axis, the synchronization signal and the broadcast signal may be transmitted symbol by symbol in an order of the DMRS 315, the PSS 301, and the PBCH 317, and the SSS 303. According to the proposed first embodiment, the BS may transmit the synchronization signal and the broadcast signal in different resources and use power of non-used resources to amplify power at the same time, and secure a low PAPR using the second waveform, thereby increasing all of the coverage of two channels. Since the DMRS is located at the front symbol of the SSB (front-loaded), effective PBCH demodulation may be performed.

Figure 4:
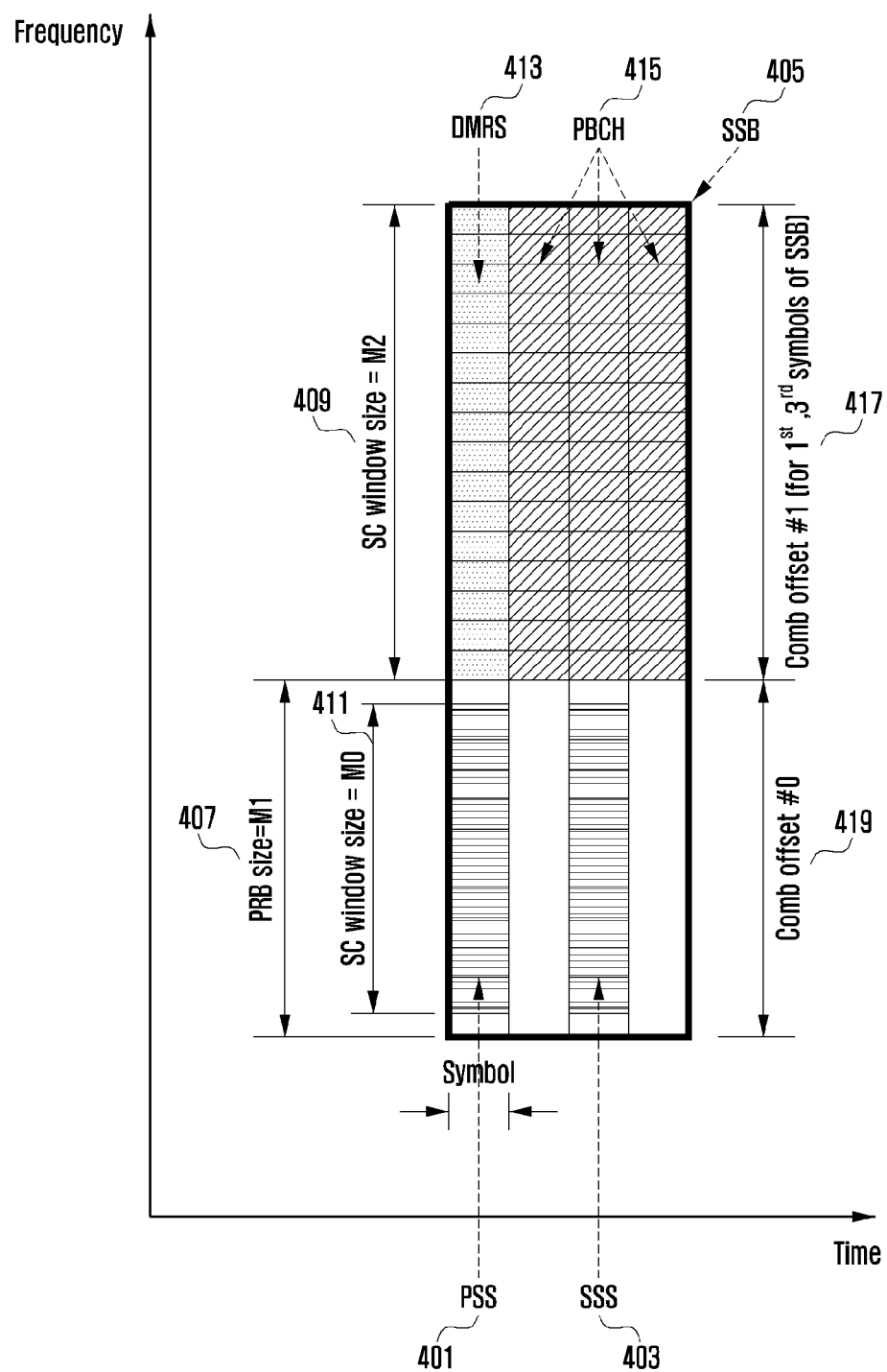
FIG. 4 illustrates a channel multiplexing method according to a second embodiment proposed by the disclosure.

FIG. 4 illustrates a channel multiplexing method according to a second embodiment proposed by the disclosure. According to the second embodiment, the BS transmits first and second synchronization signals in the same symbol as and a different frequency bandwidth from a broadcast signal. The broadcast signal transmitted in the same symbol as the synchronization signal is transmitted using an odd-numbered (or even-numbered) subcarrier in which case the synchronization signal transmitted in the same symbol as the broadcast signal is transmitted using an even-numbered (or odd-numbered) subcarrier. This is to prevent the broadcast signal and the synchronization signal from overlapping each other in the time sample during transmission of a single carrier. The UE may search for cells of FRs 1, 2, and 3, use a first waveform to receive the broadcast signal, and receive and reconstruct the first and second synchronization signals and the broadcast signal, and may search for a cell of FR4, assume a second waveform to receive the broadcast signal, and receive and reconstruct the first and second synchronization signals and the broadcast signal.

Referring to FIG. 4, a first synchronization signal 401 and a second synchronization signal 403 included in an SSB 405 are transmitted in a band 407 occupying the PRB size M1, and a bandwidth M0 411 of the second waveform is the same as the size of the product of double of the sequence length of reference numerals 401 and 403 and the applied SCS. On the other hand, the broadcast signal includes a reference signal 413 for reconstructing the broadcast signal and a broadcast signal transmission symbol 415, and resource allocation 419 of the bandwidth occupied by reference numerals 401 and 403 may be different from resource allocation 417 of the bandwidth occupied by reference numerals 413 and 415. The size M2 409 of the bandwidth occupied by reference numerals 413 and 415 may be configured regardless of M0 411, but it is preferable to configure M2=M0. In the time axis, a DMRS 413 and a PSS 401 occupy odd-numbered (even-numbered) and even-numbered (odd-numbered) time samples of one symbol corresponding to a first symbol, respectively, a PBCH 415 is transmitted in a second symbol, the PBCH 415 and the SSS 403 occupy odd-numbered (even-numbered) and even-numbered (odd-numbered) time samples of one symbol corresponding to a third symbol, respectively, and the PBCH 415 is transmitted in a fourth symbol. According to the second embodiment, the SSB uses four symbols, and thus compatibility with the conventional NR system may be improved. The synchronization signal and the broadcast signal may occupy different bandwidths, and thus reduce a PAPR of the time symbol, thereby improving coverage.

Figure 5A:
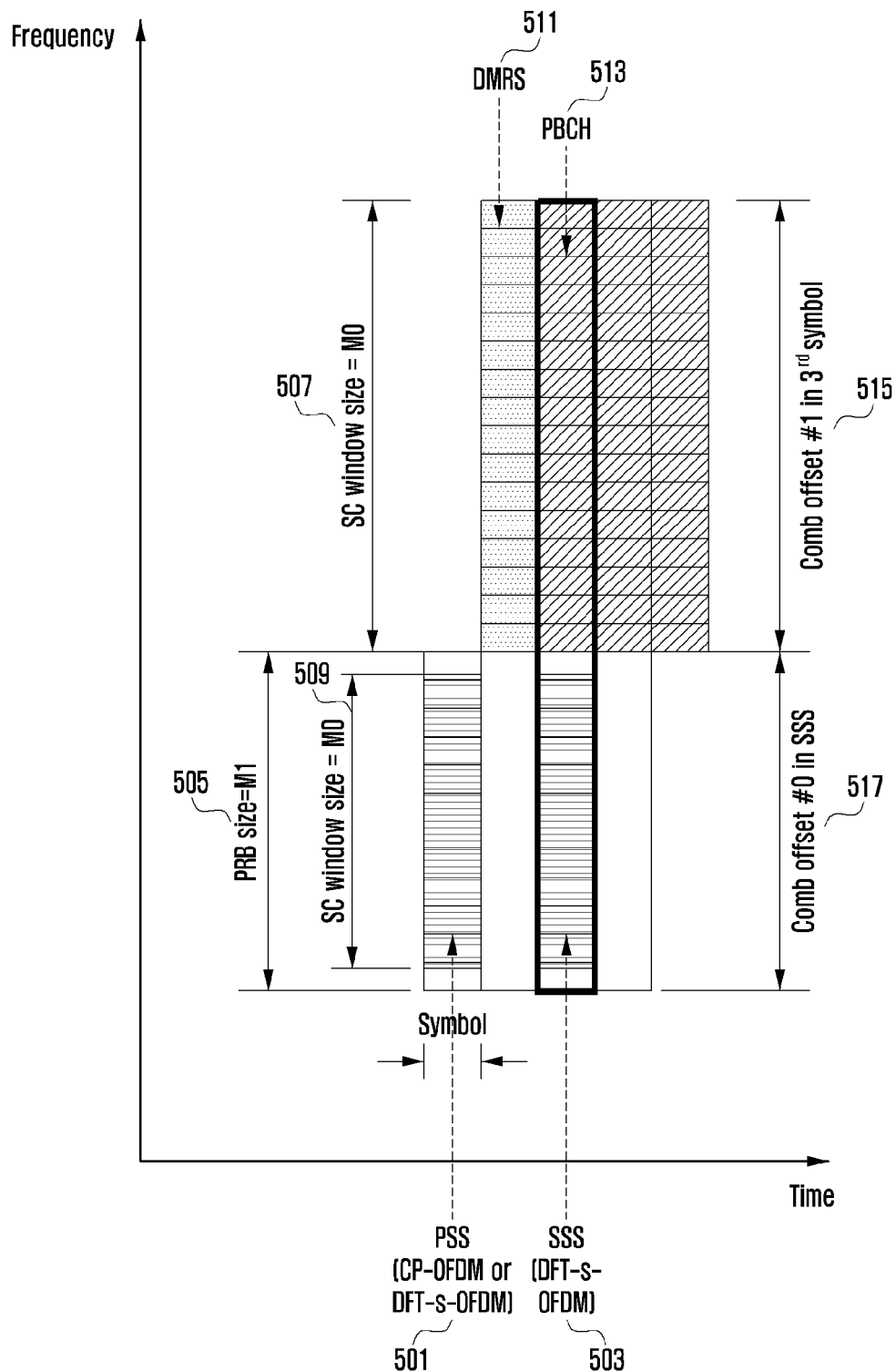
FIG. 5A illustrates a channel multiplexing method according to a third embodiment proposed by the disclosure.

FIG. 5A illustrates a channel multiplexing method according to a third embodiment proposed by the disclosure. According to the third embodiment, the BS transmits the second synchronization signal in the same symbol as and a different frequency bandwidth from the broadcast signal. The first synchronization signal is transmitted using the first waveform, and the second synchronization signal is transmitted using the second waveform. The BS uses an odd-numbered (or even-numbered) subcarrier for the broadcast signal transmitted in the same symbol as the second synchronization signal, and uses an even-numbered (or odd-numbered) subcarrier for the synchronization signal transmitted in the same symbol as the broadcast signal. The UE searches for cells of FRs, 1, 2, and 3, uses the first waveform to receive the broadcast signal, and receives and reconstructs the first and second synchronization signal and the broadcast signal, and searches for a cell of FR4, assumes the first waveform to receive the broadcast signal, assumes the second waveform to receive and reconstruct the first synchronization signal, and receives and reconstructs the second synchronization signal and the broadcast signal.

Referring to a 510 of FIG. 5A, a first synchronization signal 501 and a second synchronization signal 503 are transmitted in a band 505 occupying the PRB size M1, and a bandwidth M0 507 of the second waveform is the same as the size of the product of the sequence length of a DMRS 511 and the applied SCS. The broadcast signal includes a reference signal 511 for reconstructing the broadcast signal and a broadcast signal transmission symbol 513. The BS transmits the first synchronization signal 501 using the first waveform, transmits the second synchronization signal 503 using the second waveform, uses an odd-numbered (or even-numbered) subcarrier to transmit the broadcast signal 513 transmitted in the same symbol as the second synchronization signal 503 as indicated by reference numeral 515, and uses an even-numbered (or odd-numbered) subcarrier to transmit the second synchronization signal 503 transmitted in the same symbol as the broadcast signal 513 as indicated by reference numeral 517. The first synchronization signal 501 and the second synchronization signal 503 may be transmitted in M1 PRBs 505 in which case the bandwidth M0 509 of the second wavelength applied to the second synchronization signal 503 may be the same as the size 507.

Figure 5B:
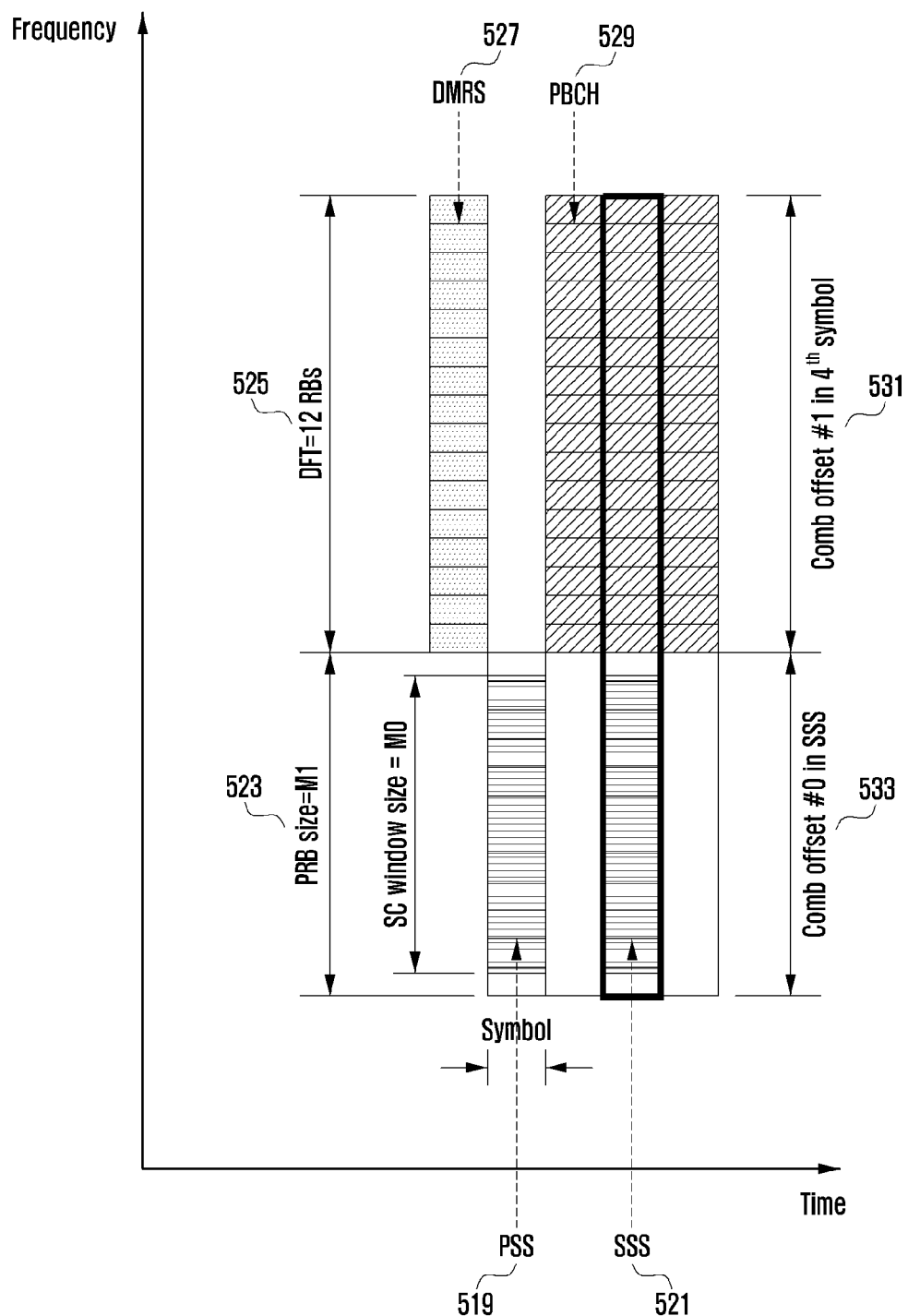
FIG. 5B illustrates another channel multiplexing method according to a third embodiment proposed by the disclosure.

FIG. 5B illustrates another channel multiplexing method according to a third embodiment proposed by the disclosure. According to the third embodiment, the location of the DMRS for the broadcast signal may vary. In b 520, an example in which the DMRS is transmitted at the location different from that in a 510 is illustrated. In b 520, a DMRS 527 is located at a first symbol of the SSB, a the second synchronization signal 521 and a PBCH 529 are multiplexed in a fourth symbol of the SSB unlike in a 510. At this time, as illustrated in a 510, the multiplexed second synchronization signal 521 and PBCH 529 may be transmitted using crossed subcarrier resources. According to the third embodiment, a second waveform bandwidth 525 applied to the DMRS 527 and the PBCH 529 may be 12 RBs. According to the proposed third embodiment, the first synchronization signal is transmitted using the first waveform, and thus the UE may receive the first synchronization signal on the basis of the assumption that the same first synchronization signal is transmitted regardless of a band of a cell for transmitting the SSB. Further, since the first synchronization is transmitted using the first waveform, there is no signal transmitted in the same symbol in spite of a high PAPR, the coverage may be improved due to power amplification. As the second synchronization signal and the broadcast signal occupy different bandwidths, transmission may be performed with a low PAPR of the time symbol and thus the coverage may be improved.

Figure 6:
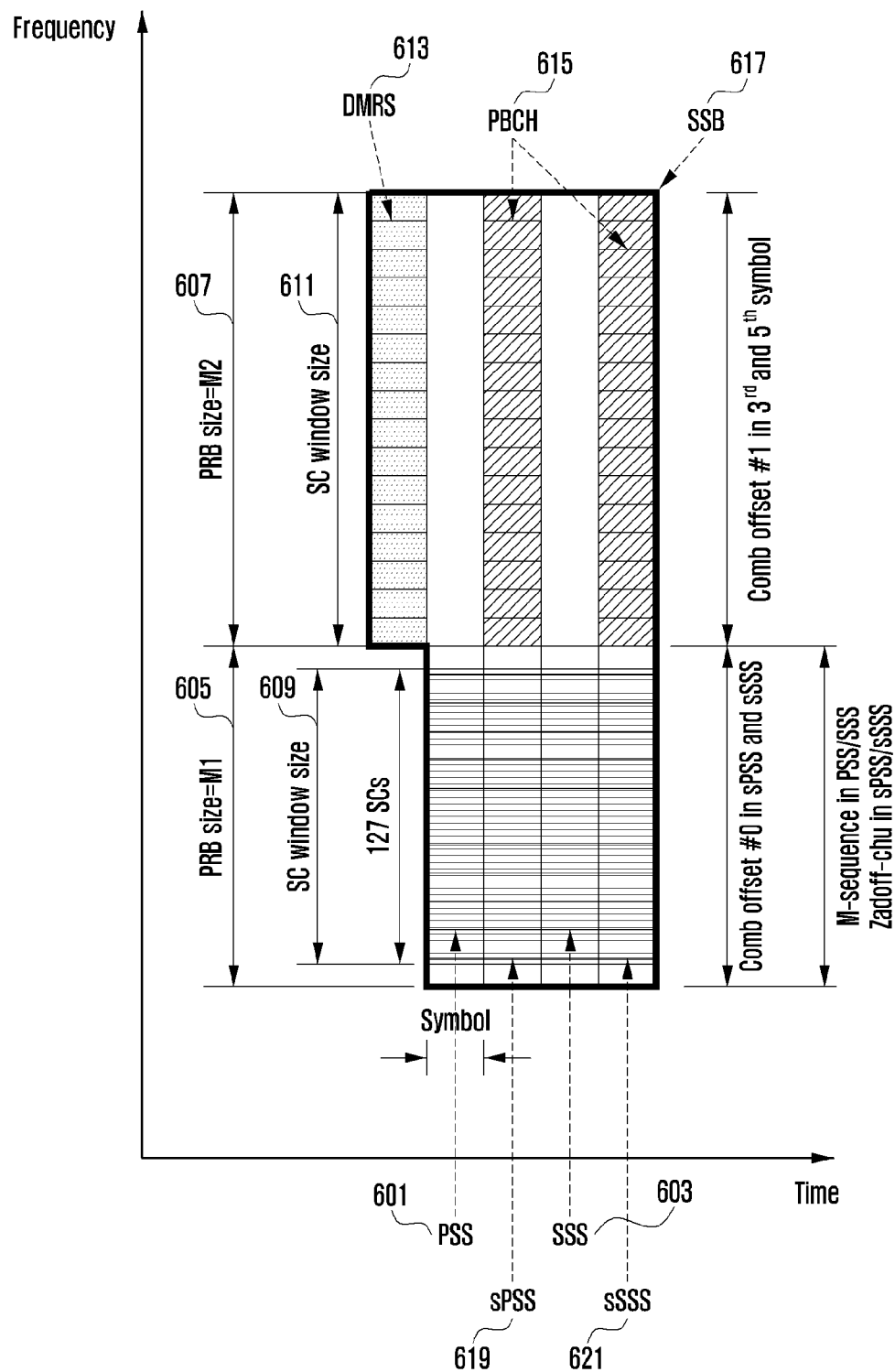
FIG. 6 illustrates a channel multiplexing method according to a fourth embodiment proposed by the disclosure.

FIG. 6 illustrates a channel multiplexing method according to a fourth embodiment proposed by the disclosure. According to the fourth embodiment, the BS transmits first and second synchronization signals in a different symbol from and a different frequency bandwidth from a broadcast signal, and transmits the first and second synchronization signals using the first waveform. The first and second synchronization signals may be transmitted using M sequence. The BS transmits third and fourth synchronization signals in the same symbol as or a different frequency band from the broadcast signal, and transmits the third and fourth synchronization signals using the second waveform. The third and fourth synchronization signals may be transmitted using Zadoff-Chu (ZC) sequence.

The BS uses an odd-numbered (or even-numbered) subcarrier to transmit the broadcast signal transmitted in the same symbol as the third and fourth synchronization signals and uses an even-numbered (or odd-numbered) subcarrier to transmit the third and fourth synchronization signal. That is, the BS transmits the broadcast signal and the third and fourth synchronization signals through subcarrier resources that are crossed such that time samples do not overlap each other in a single carrier. The UE may search for cells of FRs 1, 2, and 3, use the first waveform to receive the broadcast signal, and reconstruct the first and second synchronization signal and the broadcast signal, and may search for a cell of FR4, assume the first waveform to receive the broadcast signal, receive and reconstruct the first and second synchronization signals, and receive and reconstruct the third and fourth synchronization signals and the broadcast signal on the basis of the assumption of the second waveform. The UE may first attempt reception of the first and second synchronization signals in FRs 1, 2, and 3, and may first attempt reception of the third and fourth synchronization signals in FR 4.

Referring to FIG. 6, the BS transmits a first synchronization signal 601 and a second synchronization signal 603 using the first waveform in a first frequency band to transmit an SSB 617, and transmits a third synchronization signal 619 and a fourth synchronization signal 621 using the second waveform in the same frequency band. A second waveform bandwidth applied to the third synchronization signal 619 and the fourth synchronization signal 621 may be the same as 127 subcarrier spacings as indicated by reference numeral 609. The number of subcarriers occupied by the second waveform may be larger than or equal to the number of subcarriers occupied by the first and second synchronization signals, but should be equal to or smaller than the number 605 of PRBs occupied by the first synchronization signal. The third synchronization signal 619 and the fourth synchronization signal 621 are transmitted in the same symbol as the broadcast signal 615, and resource allocation between the third and fourth synchronization signals 619 and 621 and the broadcast signal 615 does not overlap each other. That is, the third and fourth synchronization signals 619 and 621 are transmitted using an even-numbered (odd-numbered) subcarrier among subcarriers of the occupied bandwidth, and the broadcast signal 615 is transmitted using an odd-numbered (even-numbered) subcarrier. The signal bandwidth 607 occupied by the DMRS 613 and the broadcast signal 615 may have the PRB size M2 (or a second waveform bandwidth 611 applied to the DMRS 613 and the broadcast signal 615 may have the PRB size M2), and M2 should be larger than or equal to the size M1 of the signal bandwidth 605 (the number of PRBs) occupied by the synchronization signals 601, 603, 619, and 621 and it is preferable that M1=M2.

According to the proposed fourth embodiment, the UE may use the synchronization signals using the first waveform and the second waveform to receive system information or some thereof. That is, since the first synchronization signal and the second synchronization signal of the same resource structure can be transmitted regardless of the frequency band of the cell, the UE (of the cell of FR4) supporting the conventional 5G system may detect the first synchronization signal and the second synchronization signal, and the UE supporting the cell of FR4 may or may not detect the first synchronization signal and the second synchronization signal. Further, since another signal is not transmitted in the symbol in which the first and second synchronization signals are transmitted, there is an advantage of guaranteeing the coverage of the first and second synchronization signals through the use of power of corresponding non-used resources to amplify power in spite of the first waveform having a high PAPR and guaranteeing the wide coverage with a low PAPR as the third and fourth synchronization signals and the broadcast signal use the second waveform having different resource configurations.

Figure 7:
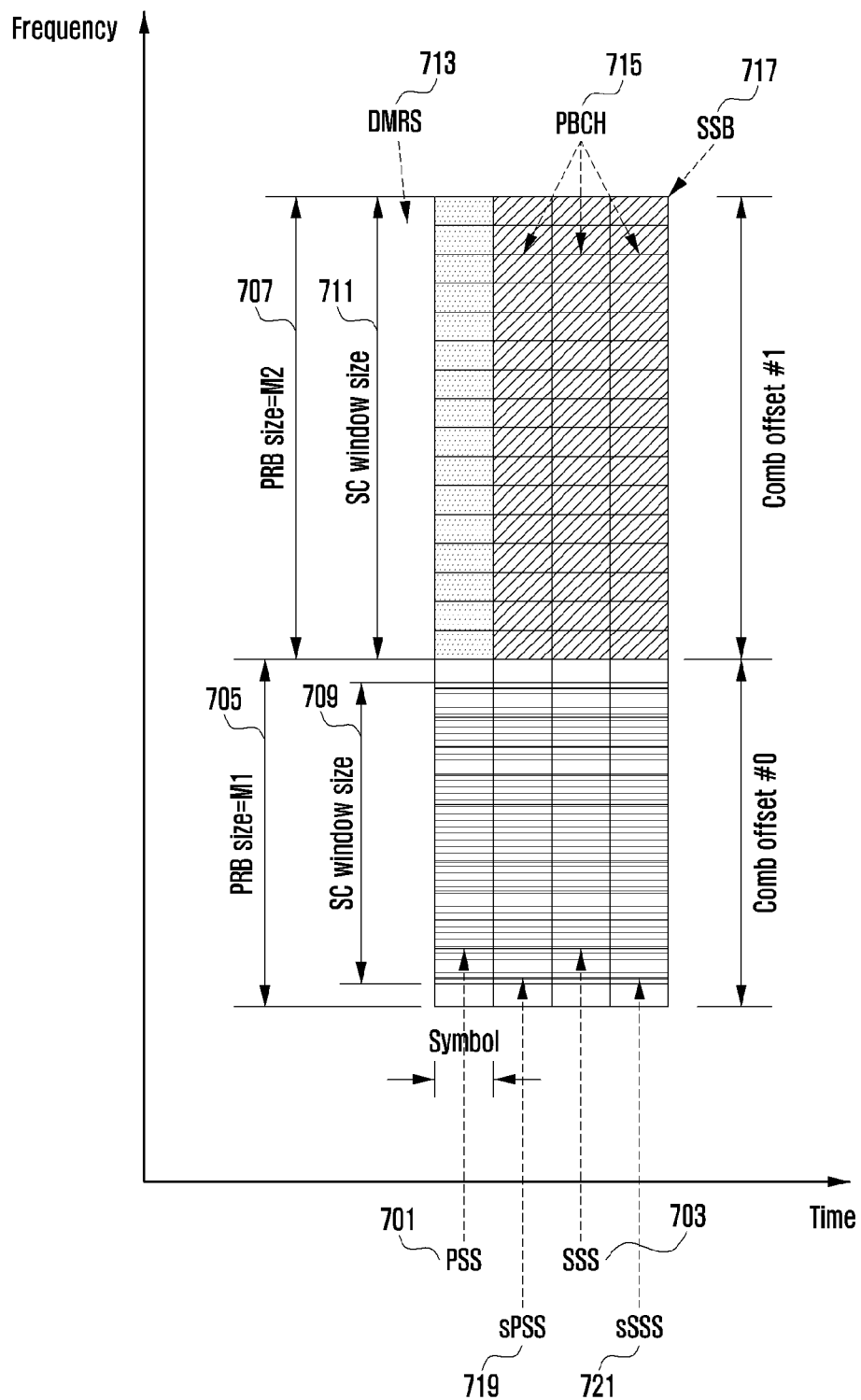
FIG. 7 illustrates a channel multiplexing method according to a fifth embodiment proposed by the disclosure.

FIG. 7 illustrates a channel multiplexing method according to a fifth embodiment proposed by the disclosure. According to the fifth embodiment, the BS may transmit first, second, third, and fourth synchronization signals in the same symbol as and a different frequency bandwidth from a DMRS and a broadcast signal, and at this time, the BS may use an odd-numbered (or even-numbered) subcarrier to transmit the broadcast signal and use an even-numbered (or odd-numbered) subcarrier to transmit the synchronization signal. That is, in the fifth embodiment, the BS may transmit the first and second synchronization signals to overlap each other. The UE may search for cells of FRs 1, 2, and 3, use the first waveform to receive the broadcast signal, receive and reconstruct the first and second synchronization signals and the broadcast signal, search for a cell of FR4, assume the second waveform to receive the broadcast signal, and receive and reconstruct the first and second synchronizations or receive and reconstruct the third and fourth synchronization signal and the broadcast signal on the basis of the assumption of the second waveform. The UE may first attempt reception of the first and second synchronization signals in FRs 1, 2, and 3, and first attempt reception of the third and fourth synchronization signals in FR4, Referring to FIG. 7, a first bandwidth occupies M1 PRBs 705, and first, second, third, and fourth synchronization signals 701, 703, 719, and 721 are transmitted through the second waveform in an SSB 717. A second waveform bandwidth 709 applied to the synchronization signals 701, 703, 719, and 721 is included in the M1 PRBs 705. Broadcast signals 713 and 715 including a DMRS are transmitted in the same symbol as and a different bandwidth from the synchronization signal, and a bandwidth 707 occupied by the DMRS and the broadcast signals 713 and 715 is transmitted to a region of M2 PRBs. At this time, sequences of subcarriers used in the first band 705 and subcarriers used in the second band 707 do not overlap, and the BS may use odd-numbered subcarriers in the first band and even-numbered subcarrier resources in the second band through, for example, comb. Further, a second waveform bandwidth 711 applied to the DMRS 713 and the broadcast signal 715 may be the same as reference numeral 707. In this case, the symbol transmitted by the BS may maintain a PAPR at the same level as a single carrier waveform.

Figure 8:
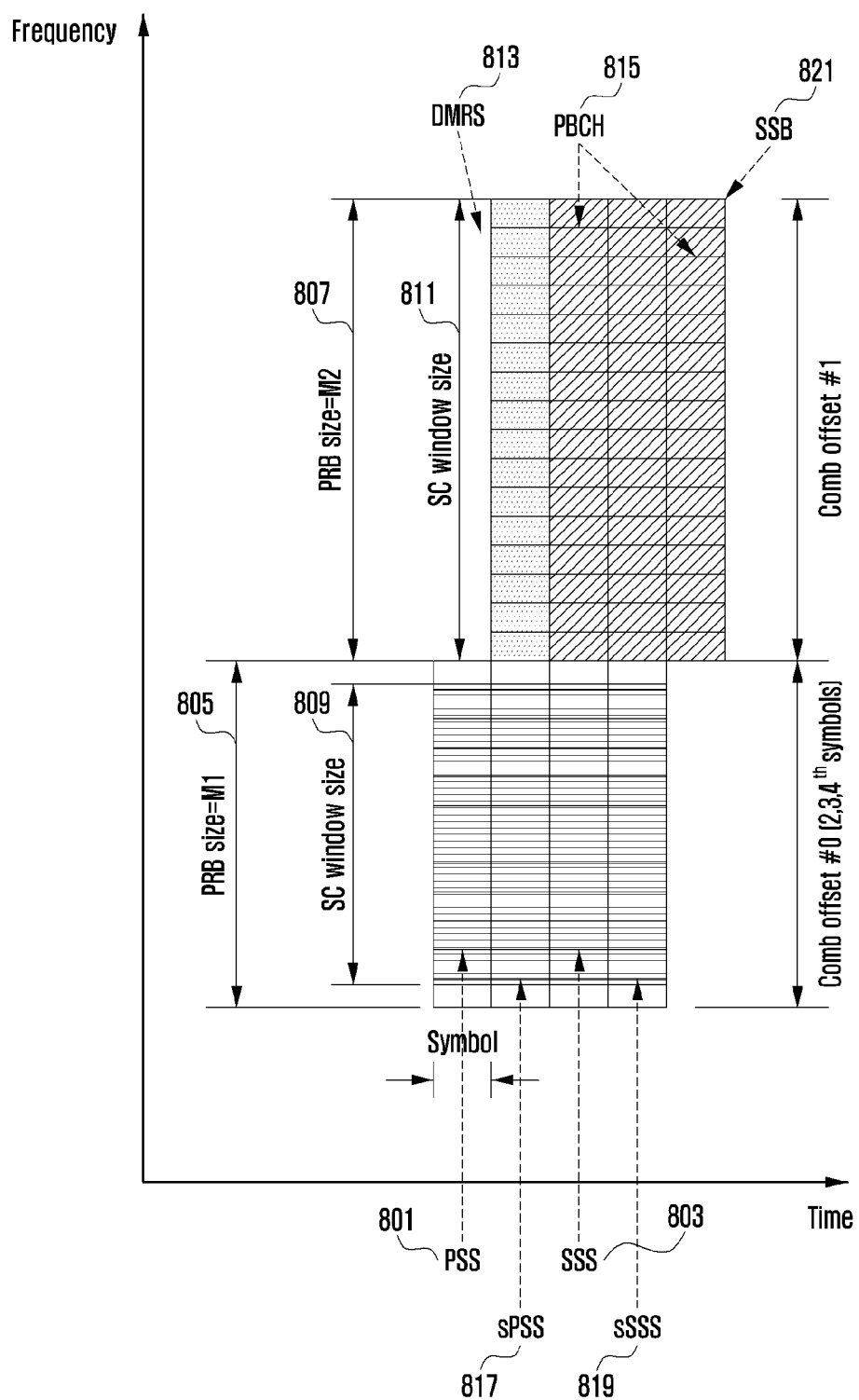
FIG. 8 illustrates a channel multiplexing method according to a sixth embodiment proposed by the disclosure.

FIG. 8 illustrates a channel multiplexing method according to a sixth embodiment proposed by the disclosure. According to the sixth embodiment, the BS transmits a first synchronization signal (including a DMRS) in the same symbol as and a different frequency bandwidth from a broadcast signal, and at this time, the first synchronization signal is transmitted using the first waveform. The BS transmits second, third, and fourth synchronization signals in the same symbol as and a different frequency from the broadcast signal and transmit the same using the second waveform. The BS may use an odd-number (or even-numbered) subcarrier to transmit the broadcast signal transmitted in the same symbol as the second, third, and fourth synchronization signals, and use even-numbered (or odd-numbered) subcarrier to transmit the synchronization signal. The UE may search for cells of FRs 1, 2, and 3, use the first waveform to receive the broadcast signal, receive and reconstruct the first and second synchronization signals and the broadcast signal, search for a cell of FR4, assume the first waveform to receive the broadcast signal, receive and reconstruct the first synchronization signal, receive and reconstruct the second synchronization signal on the basis of the assumption of the second waveform, and receive and reconstruct the third and forth synchronization signals and the broadcast signal on the basis of the assumption of the second waveform. The UE may first attempt reception of the first and second synchronization signals in FRs 1, 2, and 3 and first attempt reception of the third and fourth synchronization signals in FR4.

Referring to FIG. 8, the BS transmits a first synchronization signal 801 using the first waveform in a first bandwidth 805 and transmits second, third, and fourth synchronization signals 803, 817, and 819 using the second waveform in the first bandwidth 805 in an SSB 821. At this time, the BS transmits broadcast signals 813 and 815 including a DMRS using the second waveform in a second bandwidth 807. The first bandwidth 805 may be the same the size of M1 PRBs, and a second waveform bandwidth 809 applied to the second, third, and fourth synchronization signals 803, 817, and 819 is included in the first bandwidth 805. The second bandwidth 807 may be the same as the size of M2 PRBs, and a second waveform bandwidth 811 applied to the broadcast signals 813 and 815 including the DMRS may be the same as the second bandwidth 807. However, in a symbol in which the first synchronization signal 801 using the first waveform is transmitted, no signal is transmitted in the second bandwidth. In a symbol in which a broadcast signal 815 overlaps the second, third, and fourth synchronization signals 803, 817, and 819, different subcarrier resources may be used for respective bands. That is, the BS uses an even-numbered (or odd-numbered) subcarrier to transmit a signal transmitted in the first bandwidth 805 and uses an odd-numbered (or even-numbered) subcarrier to transmit a signal transmitted in the second bandwidth 807. On the other hand, the broadcast signal 815 of a fifth symbol that does not overlap the synchronization signal in the time symbol may be transmitted using all subcarrier resources. A gain of the proposed method is the same as the gain of the fifth embodiment.

Figure 9:
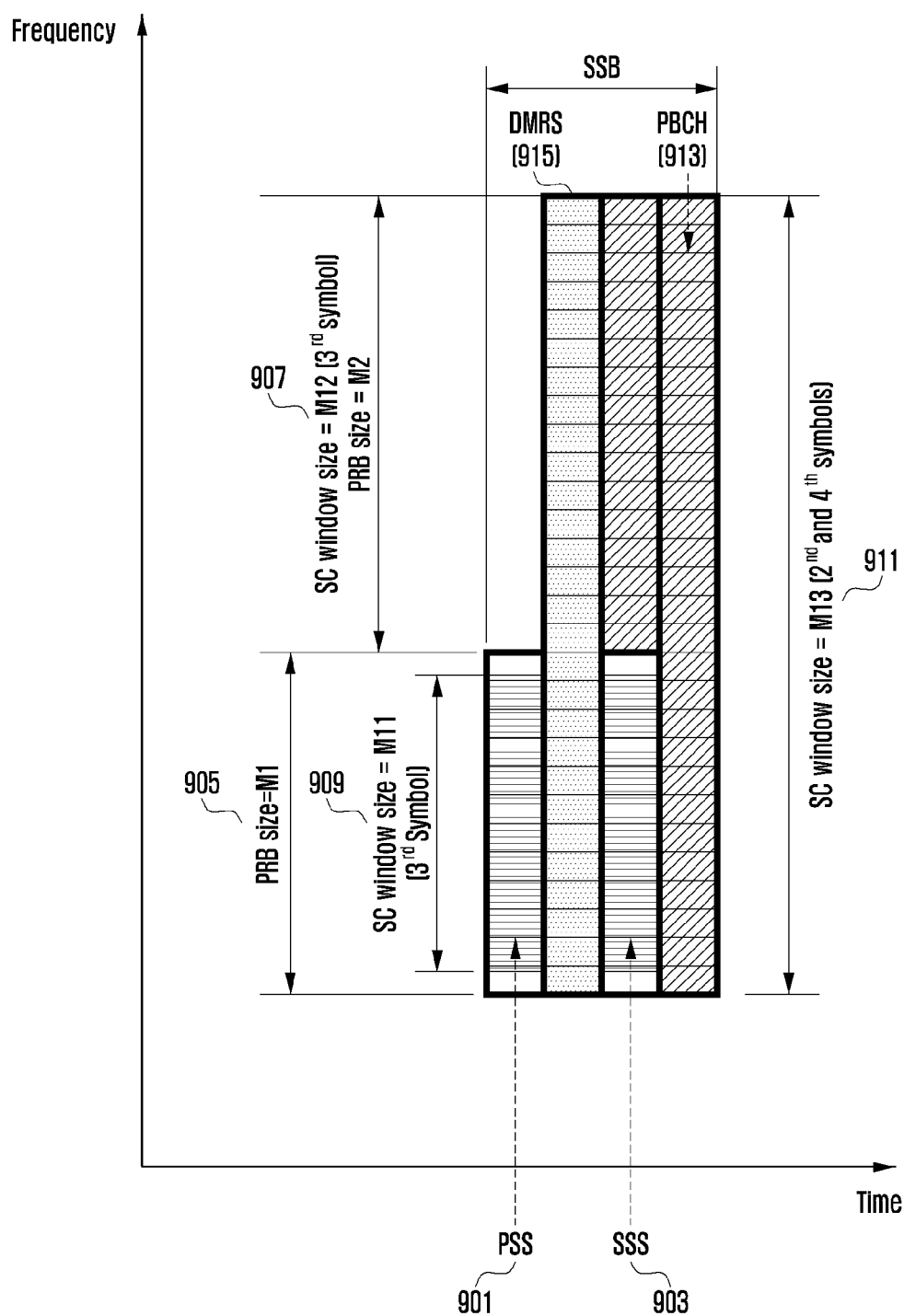
FIG. 9 illustrates a channel multiplexing method according to a seventh embodiment proposed by the disclosure.

FIG. 9 illustrates a channel multiplexing method according to a seventh embodiment proposed by the disclosure. According to the seventh embodiment, the BS may transmit a broadcast signal in a bandwidth including a transmission bandwidth of first and second synchronization signals, transmit the broadcast signal through a first single carrier band using the second waveform in a symbol in which no synchronization signal is transmitted, and transmit the broadcast signal through a second single carrier band using the second waveform in a symbol in which the synchronization signal is transmitted. The UE may search for cells of FRs 1, 2, and 3, use the first waveform to receive the broadcast signal, receive and reconstruct the first and second synchronization signals and the broadcast signal, search for a cell of FR4, assume the second waveform to receive the broadcast signal, and receive and reconstruct the first and second synchronization signals and the broadcast signal. Further, the UE may use different second waveform bandwidths (single carrier bandwidths) for respective symbols to receive and reconstruct the broadcast signal of FR4.

Referring to FIG. 9, the BS transmits a first synchronization signal 901 using the first waveform in a first bandwidth M1 905 in a first symbol of an SSB and transmits a DMRS 915 using the second waveform in a bandwidth 911 (third bandwidth) having the size of M1+M2 PRBs including M1 in a second symbol. A second synchronization signal 903 and a broadcast signal 913 are transmitted together using the second waveform in a third symbol. When the broadcast signal 913 is transmitted in the same symbol (for example, a third symbol of the SSB) as the second synchronization signal 903, the broadcast signal 913 is transmitted in a second band 907 corresponding to M2 PRBs, and the second synchronization signal 903 and the broadcast signal 913 are allocated to different resources in the corresponding symbol. That is, the broadcast signal 913 uses odd-numbered (or even-numbered) resources of the subcarrier, and the second synchronization signal 903 uses even-numbered (or odd-numbered) resources. In a fourth symbol, the broadcast signal 915 is transmitted with the size of M1+M2 using the second waveform. According to the proposed embodiment, the UE may identify a waveform of the second synchronization signal and detect whether the corresponding SSB is based on the first waveform or the second waveform. Further, the UE may determine which information among MIB information used on the basis of the assumption of the first waveform and MIB information used on the basis of the assumption of the second waveform is transmitted by identifying the waveform of the second synchronization signal.

Figure 10A:
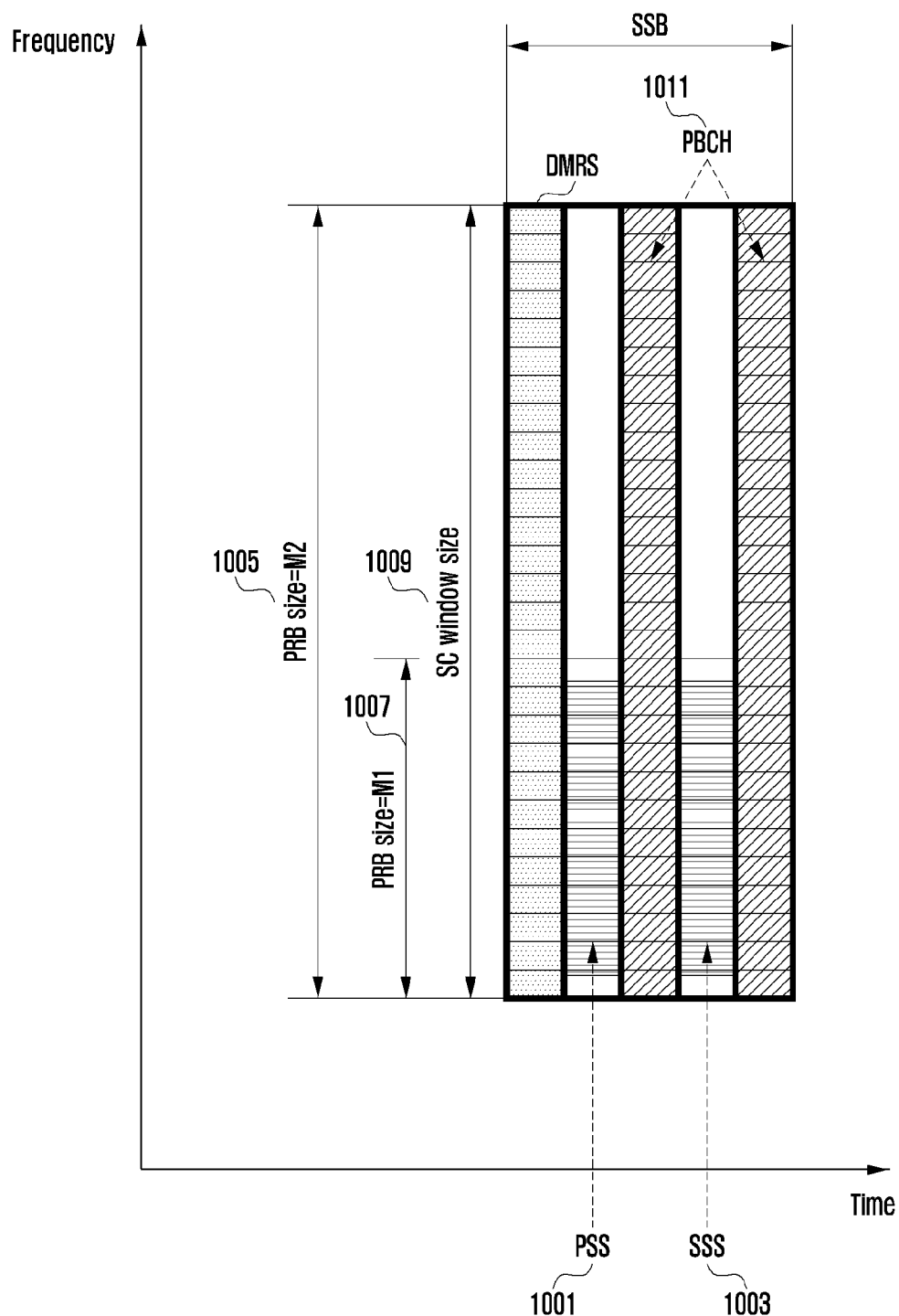
FIG. 10A illustrates a channel multiplexing method according to an eighth embodiment proposed by the disclosure.

FIG. 10A illustrates a channel multiplexing method according to an eighth embodiment proposed by the disclosure. According to the proposed eighth embodiment, the BS may transmit a broadcast signal in a wider bandwidth including a transmission bandwidth, in which first and second synchronization signals are transmitted. The first and second synchronization signals may be transmitted using the first waveform and the broadcast signal may be transmitted using the second waveform. The UE may search for cells of FRs 1, 2, and 3, use the first waveform to receive the broadcast signal, receive and reconstruct the first and second synchronization signals and the broadcast signal, search for a cell of FR4, assume the first waveform to receive the broadcast signal, receive and reconstruct the first and second synchronization signals, and receive and reconstruct the broadcast signal on the basis of the assumption of the second waveform.

Figure 10B:
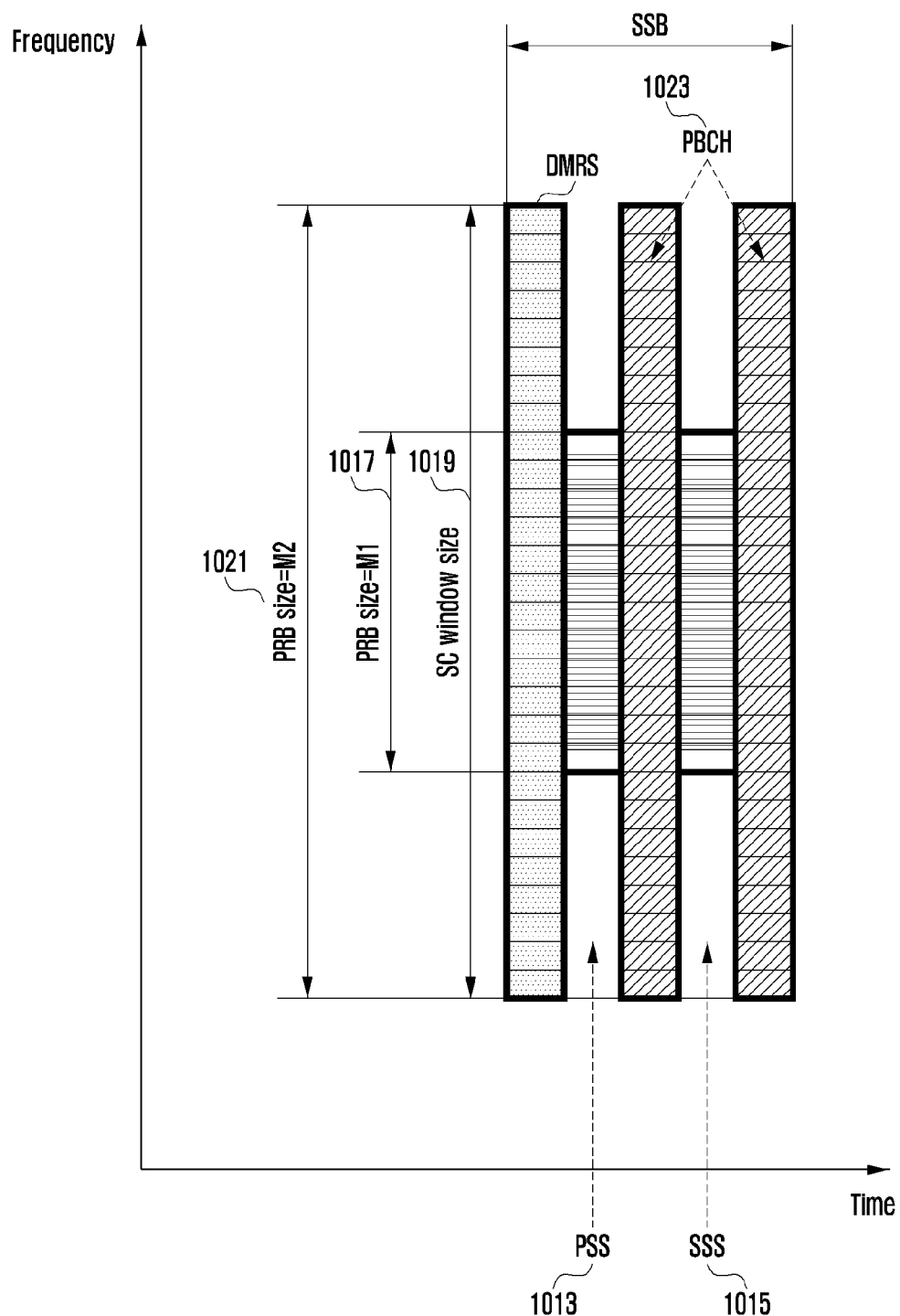
FIG. 10B illustrates another channel multiplexing method according to the eighth embodiment proposed by the disclosure.

Referring to FIG. 10A, a first synchronization signal 1001 and a second synchronization signal 1003 are transmitted using the first waveform in a first bandwidth 1007 having the size of M1 PRBs. A broadcast signal 1011 including a DMRS is transmitted in a second bandwidth 1005 having the size of M2 PRBs larger than the first bandwidth having the size of M1 PRBs in a symbol in which the first and second synchronization signals are not transmitted, and the second bandwidth includes the first bandwidth. A second waveform bandwidth 1009 applied to the broadcast signal 1011 may be the same as the second bandwidth 1005. The first bandwidth 1007 and the second bandwidth 1005 may be configured to have the same lowest frequency (or highest frequency) in each bandwidth in a 1010 of FIG. 10A, and may be configured to have the same center location as illustrated in b 1020 of FIG. 10B. FIG. 10B illustrates another channel multiplexing method according to the eighth embodiment proposed by the disclosure. In b 1020, the configuration of first and second synchronization signals 1013 and 1015, a broadcast signal 1023, and a second waveform bandwidth 1019 except for the location of the bandwidth may refer to the description of a 1010. The proposed eighth embodiment includes both a method using the first waveform to transmit the first synchronization signal and the second synchronization signal and using the second waveform to transmit the broadcast signal and a method using the second waveform to transmit all of the first and second synchronization signals and the broadcast signal. Through the proposed method, the UE can distinguish different channels in the time symbol, and there is an advantage of guaranteeing the coverage because no frequency multiplexing is performed.

Figure 11A:
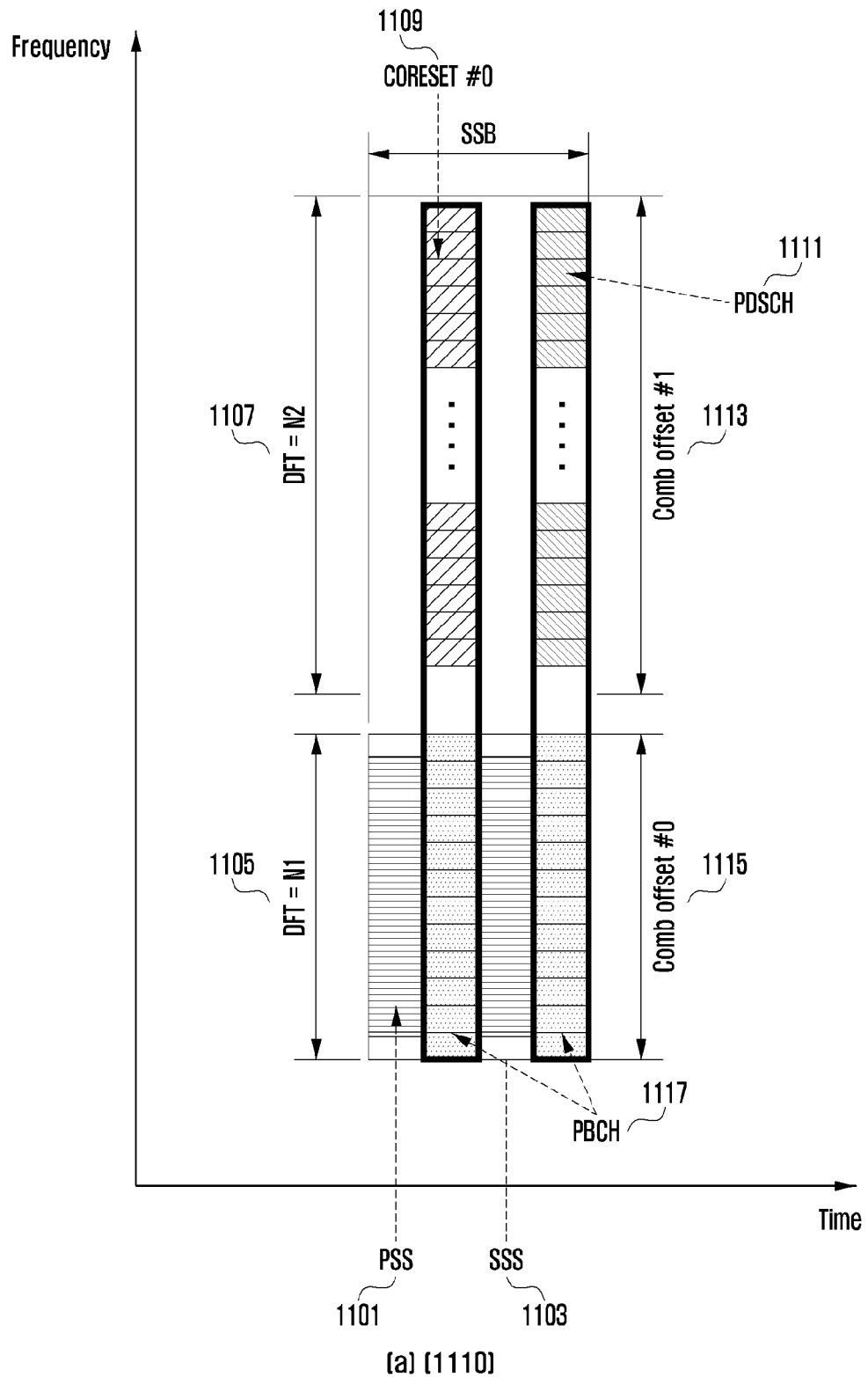
FIG. 11A illustrates a channel multiplexing method according to a tenth embodiment proposed by the disclosure.

FIG. 11A illustrates a channel multiplexing method according to a ninth embodiment proposed by the disclosure. According to the proposed ninth embodiment, the BS transmits first and second synchronization signals using the first waveform in a first bandwidth and transmits a broadcast signal using the second waveform in time resources (symbol) different from the first and second synchronization signals in the first bandwidth. When the bandwidth of the broadcast signal is larger than the bandwidth of the first and second synchronization signals (or when an additional system signal (for example, an SIB) is transmitted through a PDCCH or a PDSCH), a signal of one or more bands is transmitted in the symbol in which the broadcast signal is transmitted, and each band may correspond to a separate single carrier band. When a signal of two bands is transmitted in the symbol in which the broadcast signal is transmitted, an odd-numbered (or even numbered) subcarrier may be used in a first band, and an even-numbered (or odd-numbered) subcarrier may be used in a second band. The UE may search for cells of FRs 1, 2, and 3, use the first waveform to receive the broadcast signal, receive and reconstruct the first and second synchronization signals and the broadcast signal, search for a cell of FR4, assume the first waveform to receive the broadcast signal, receive and reconstruct the first and second synchronization signals, and receive and reconstruct another channel including the broadcast signal on the basis of the assumption of the second waveform.

Referring to FIG. 11A, in a 1110, a first synchronization signal 1101 and a second synchronization signal 1103 are transmitted in a first bandwidth 1105 having the size of N1 PRBs, and at this time, another signal is not transmitted in another band of the corresponding symbol. The first synchronization signal 1101 and the second synchronization signal 1103 are transmitted using the first waveform. On the other hand, a broadcast signal 1117 is transmitted using the second waveform in the first bandwidth 1105. The broadcast signal 1117 may be transmitted to deliver system information for initial access in the first bandwidth 1105. When the BS needs to transmit additional system information, the BS may configure control region #0 1109 for access in the same symbol (for example, a second symbol of the SSB) as the broadcast signal 1103 and the second bandwidth 1107 to transmit a PDCCH and transmit additional system information through a PDSCH in the same symbol (for example, a fourth symbol) as the broadcast signal and the second bandwidth 1107. The size of the second bandwidth 1107 has the size of N2, and at this time, the broadcast signal 1103 is transmitted in the same symbol, and thus the broadcast signal 1103 should use different resources from those of the PDCCH and the PDSCH. For example, there may be a method of configuring different comb offsets as indicated by reference numerals 1113 and 1115.

Figure 11B:
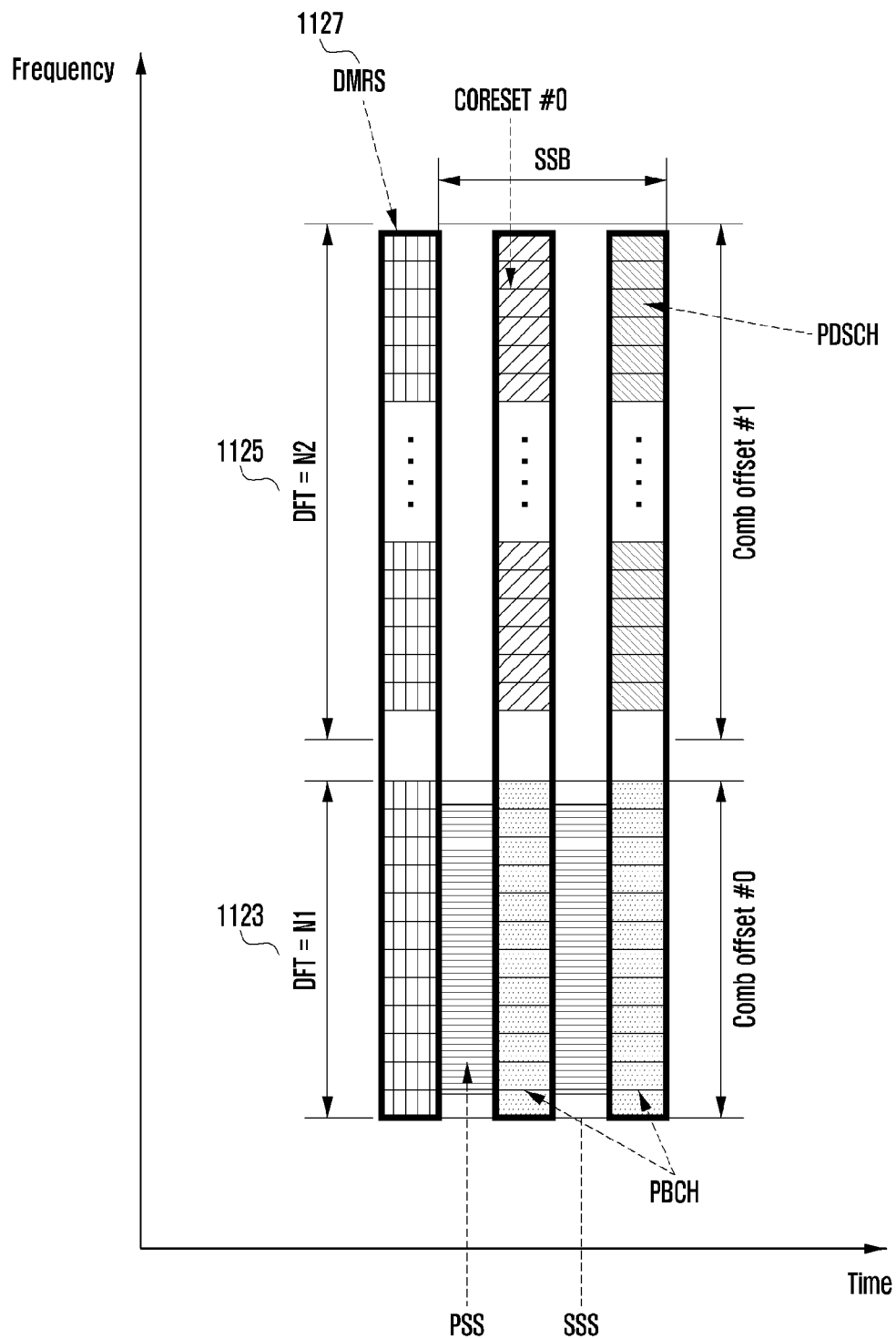
FIG. 11B illustrates another channel multiplexing method according to the tenth embodiment proposed by the disclosure.

FIG. 11B illustrates another channel multiplexing method according to the ninth embodiment proposed by the disclosure. When an additional DMRS is needed, the DMRS may be added to the SSB in b 1120. A DMRS 1127 may be transmitted in a symbol before the first synchronization signal through a front-loaded scheme, and at this time, the DMRS may be transmitted using the second waveform. For a sequence of the DMRS, all of a method of separately generating sequences of the length N1 and the length of N2 and transmitting the sequences in a first bandwidth 1123 and a second bandwidth 1125, respectively, and a method of generating a sequence of the length of N1+N2 and transmitting the sequence in the first bandwidth 1123 and the second bandwidth 1125 can be used.

Figure 12:
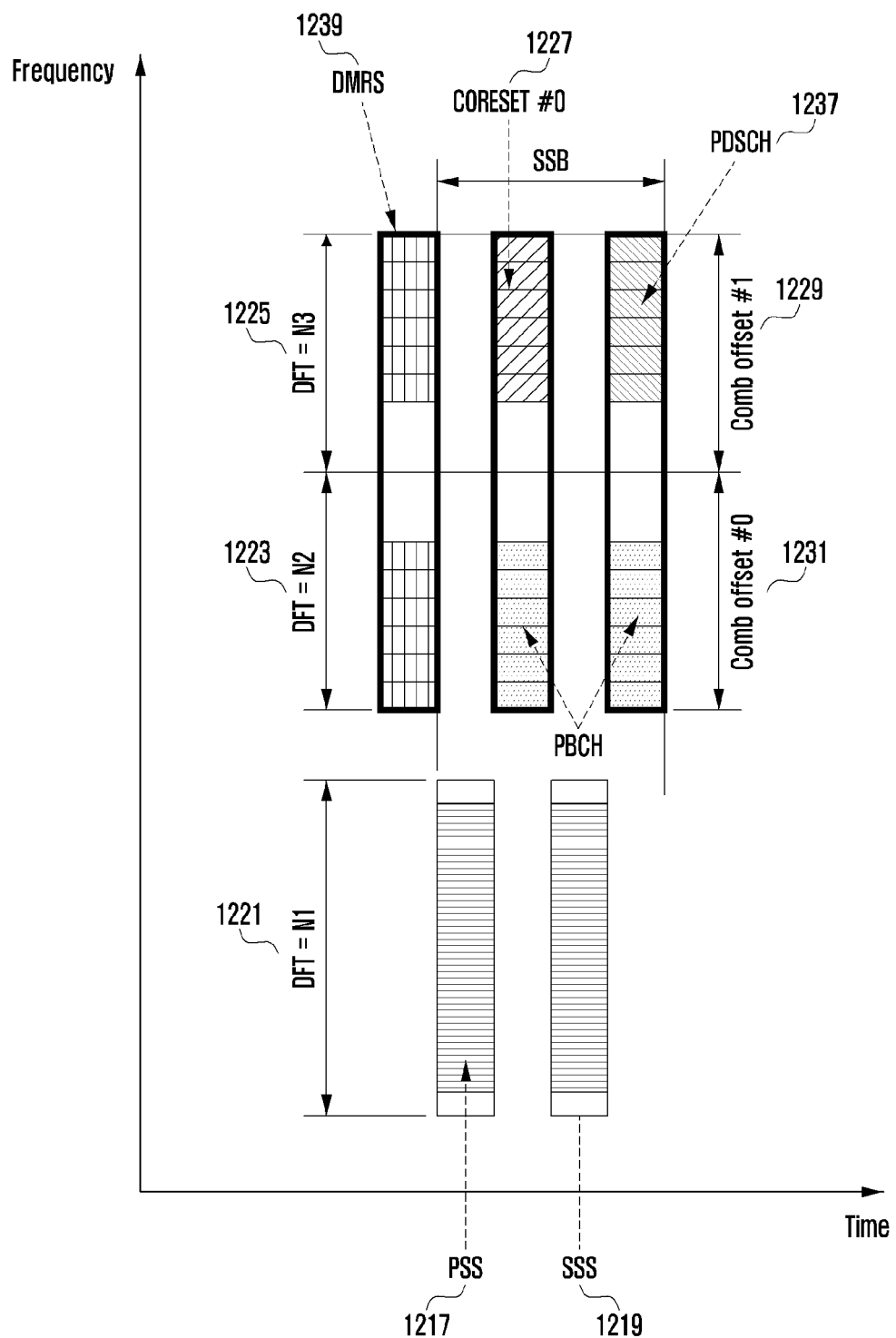
FIG. 12 illustrates a channel multiplexing method according to the tenth embodiment proposed by the disclosure.

FIG. 12 illustrates a channel multiplexing method according to a tenth embodiment proposed by the disclosure. According to the proposed tenth embodiment, the BS may transmit first and second synchronization signals using the first waveform in a first bandwidth and transmit a broadcast signal using the second waveform in different time resources (symbol) from the first and second synchronization signals in a second waveform, and the bandwidth used for transmitting the broadcast signal may be divided into two bandwidths. Specifically, the first bandwidth may be used to transmit initial access system information, and the other bandwidth may be used to transmit an additional system signal through a PDCCH and a PDSCH. When the bandwidth used to transmit the broadcast signal is divided into two bands, the BS may use an odd-numbered (or even-numbered) subcarrier to transmit a signal in the first band, and use an even-numbered (or odd-numbered) subcarrier to transmit a signal in the second band. The UE may search for cells of FRs 1, 2, and 3, use the first waveform to receive the broadcast signal, receive and reconstruct the first and second synchronization signals and the broadcast signal, search for a cell of FR4, assume the first waveform to receive the broadcast signal, receive and reconstruct the first and second synchronization signals, and receive and reconstruct another channel including the broadcast signal on the basis of the assumption of the second waveform.

Referring to FIG. 12, a first synchronization signal 1217 and a second synchronization signal 1219 are transmitted in a first bandwidth 1221 having the size of N1 PRBs, and at this time, another signal is not transmitted in another frequency band of the corresponding symbol. Further, the first synchronization signal 1217 and the second synchronization signal 1219 are transmitted through the first waveform. On the other hand, a broadcast signal 1235 is transmitted using the second waveform in a second bandwidth 1223 having the size of N2. The broadcast signal is transmitted using a second band to transmit system information for initial access. However, when the BS needs to transmit additional system information, a PDCCH in control region #0 1227 for access is transmitted using a third bandwidth 1225 having the size of N3 in the same symbol (for example, a third symbol of the SSB) as the broadcast signal. Further, additional system information may be transmitted through a PDSCH 1237 in the third bandwidth 1225 having the size of N3 in the same symbol (for example, a fifth symbol of the SSB) as the broadcast signal. At this time, since the broadcast signal is transmitted in the same symbol as the PDCCH and the PDSCH, it is required to perform transmission using non-overlapping resources. For example, different comb offsets may be configured as indicated by reference numerals 1231 and 1229. When an additional DMRS is required, a DMRS 1239 may be transmitted in a symbol before the first synchronization signal 1217 through a front-loaded scheme. At this time, the DMRS is transmitted using the second waveform, and for the sequence of the DMRS, all of a method of separately generating sequences of the length N1 and the length of N2 of the DMRS and transmitting the sequences in a second bandwidth 1223 and a third bandwidth 1225, respectively, and a method of generating a sequence of the length of N2+N3 and transmitting the sequence in the bands can be used.

Figure 13:
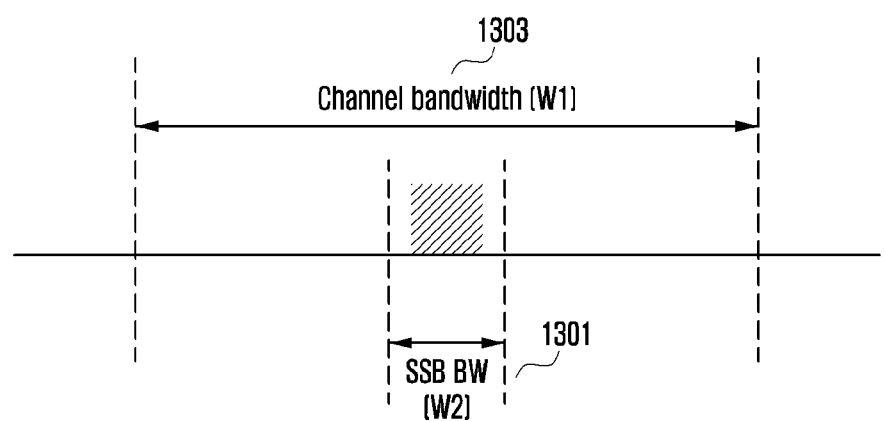
FIG. 13 illustrates a channel multiplexing method according to an eleventh embodiment proposed by the disclosure.

FIG. 13 illustrates a channel multiplexing method according to an eleventh embodiment proposed by the disclosure. According to the eleventh embodiment, the UE may search for cells of FRs 1, 2, and 3, use the first waveform to receive a broadcast signal, receive and reconstruct first and second synchronization signals and the broadcast signal, or the UE may search for a cell of FR4, use the second waveform to receive the broadcast signal, receive and reconstruct the broadcast signal, and receive an indication that a channel bandwidth of a cell receiving the broadcast signal as one of operable channel bandwidths through a codepoint of one or more pieces of system information included in the received broadcast signal. In order to search for the cell of FR4, the UE may determine the bandwidth (single carrier bandwidth) used for the second waveform as one of predetermined candidate bandwidths by subcarrier spacing and the number of used subcarriers, and attempts reception of system information through one or more reconstruction attempts.

The method proposed by the eleventh embodiment corresponds to a method of configuring the size of the first bandwidth or the second bandwidth of the synchronization signal using the second waveform according to a channel bandwidth on the basis of a Q-factor and an SSB overhead. The Q-factor is a ratio of an actual data reception filter 1301 within a channel bandwidth to the channel bandwidth 1303 for designing an RF filter. If the Q-factor is larger, complexity of the filter design becomes higher, and thus a processing time increases and an area occupied by hardware increases. If subcarrier spacing is wider, a ratio of the first bandwidth occupied by the SSB to the channel bandwidth increases. If the Q-factor is equal to or smaller than 60 and the SSB ratio of the bandwidth of the SSB to the channel bandwidth is configured as 30% or lower, the Q-factor according to the channel bandwidth and subcarrier spacing, information on whether the Q-factor is available, and the first bandwidth are as in [Table 2] below.

TABLE 2

| Channel BW | 60 kHz | 120 kHz | 240 kHz | 480 kHz |
|---|---|---|---|---|
| 200 MHz | 60k*12*12 = 8.64M (Q-factor: 200/8.64 = 23.14) | 120k*12*12 = 17.28M (Q-factor: 200/17.28 = 11.57) | NA(not available) | NA |
| 400 MHz | 60k*12*12 = 8.64M (Q-factor: 400/8.64 = 46.28) | 120k*12*12 = 17.28M (Q-factor: 400/17.28 = 23.14) | NA | NA |
| 250 MHz | 250/8.64 = 28.935 | 250/17.28 = 14.47 | NA | NA |
| 500 MHz | 500/8.94 = 57.8 | 500/17.28 = 28.94 | 500/34.56 = 14.47 | NA(500/70 = 7.142) |
| 750 MHz | NA | 750/17.28 = 43.40 | 21.70 | 10.71 |
| 1000 MHz | NA | NA | 28.94 | 14.28 |

TABLE 2-continued

| Channel BW | 60 kHz | 120 kHz | 240 kHz | 480 kHz |
|---|---|---|---|---|
| 1250 MHz | NA | NA | 36.17 | 17.85 |
| 1500 MHz | NA | NA | 43.40 | 21.42 |
| 1750 MHz | NA | NA | 50.63 | 25 |
| 2000 MHz | NA | NA | NA | 28.57 |
| 2250 MHz | NA | NA | NA | 32.142 |
| Available range | ~500 MHz | 200 to 750 MHz | 500 to 1500 MHz | 750 to 2250 MHz |

Since the UE attempts cell access without knowing a channel bandwidth, the UE first receives an SSB on the basis of a predetermined subcarrier spacing candidate according to each band to access the cell of FR4. The UE receives system information after reception of the SSB or additional system information and identifies information on the channel bandwidth in the form of one or more codepoints. A method of indicating information on the channel bandwidth may include a method of indicating an absolute channel bandwidth in the form a codepoint as shown in [Table 3] and a method of predetermining a default bandwidth and indicating an actual bandwidth in the form of a codepoint as shown in [Table 4].

TABLE 3

| Codepoint | Channel bandwidth |
|---|---|
| 00 | 200 MHz |
| 01 | 250 MHz |
| 10 | 400 MHz |
| 11 | 500 MHz |

TABLE 4

| Codepoint | Channel bandwidth (default bandwidth: 250 MHz) |
|---|---|
| 00 | 1x (that is, 250 MHz) |
| 01 | 2x (that is, 500 MHz) |
| 10 | 4x (that is, 1 GHz) |
| 11 | 8x (that is, 2 GHz) |

Channel bandwidths shown in [Table 3] and [Table 4] are only examples, and another channel bandwidth in the range shown in [Table 2] may be indicated in the form of a codepoint.

A twelfth embodiment describes a method of configuring a channel raster for searching for an SSB. The channel raster for searching for the SBB may be understood as the center frequency location of the SSB. The conventional channel raster search is configured as shown in [Table 5] below.

TABLE 5

| Frequency range | $\Delta F_{Global}$ | $F_{REF-Offs}$ [MHz] | $N_{REF-Offs}$ | Range of $N_{REF}$ |
|---|---|---|---|---|
| 0-3000 MHz | 5 kHz | 0 MHz | 0 | 0-599999 |
| 3000-24250 MHz | 15 kHz | 3000 MHz | 600000 | 600000-2016666 |
| 24250-100000 MHz | 60 kHz | 24250 MHz | 2016667 | 2016667-3279167 |

The relationship between parameters is described below.

$$F_{REF} = F_{REF-Offs} + \Delta F_{Global}(N_{REF} - N_{REF-Offs})$$

Accordingly, a search for a channel is performed in units of 60 kHz in a frequency band higher than or equal to 60 GHz. When the search for the channel is performed in units of 60 kHz, a signal of another system (for example, point-to-point), which may perform frequency occupancy in a channel higher than or equal to 60 GHz in units of 250 MHz, cannot be searched for, and multiplexing with the other system in the same band is not possible. In this case, in order to facilitate the search for the channel occupied by the other system (point-to-point) occupying the corresponding band and to guarantee a more rapid channel raster search, the channel raster may be configured as shown in [Table 6] below.

TABLE 6

| Frequency range | $\Delta F_{Global}$ | $F_{REF-Offs}$ [MHz] | $N_{REF-Offs}$ | Range of $N_{REF}$ |
|---|---|---|---|---|
| 0-3000 MHz | 5 kHz | 0 MHz | 0 | 0-599999 |
| 3000-24250 MHz | 15 kHz | 3000 MHz | 600000 | 600000-2016666 |
| 24250-56200 MHz | 60 kHz | 24250 MHz | 2016667 | 2016667-2547500 |
| 56200-100000 MHz | 125 kHz | 56200 MHz | 2547501 | 2547501-2897901 |

When the channel raster is configured as shown in [Table 5], it is possible to perform a channel search two times faster than the conventional channel search while maintaining multiplexing with another system occupying a band of 250 MHz.

When a channel band of 70 GHz is configured on the basis of [Table 5], the channel band may be configured through the following method. This is a method of solving the following six problems. A first problem is to configure a frequency division multiplexing (FDD) channel including an uplink band and a downlink band within the band, a second problem is to configure a channel band to be a multiple of 250 MHz, a third problem is to also use a time division multiplexing (TDD) channel in a band of 70 GHz, a fourth problem is to coexist with the convention point-to-point service, and a fifth problem is to protect an amateur radio signal using a band of 75.5 GHz. A last problem is to make the size of an FDD duplexer (meaning an interval between an uplink band and a downlink band of the FDD channel) larger than or equal to 2.5 GHz. At this time, available bandwidths 250, 500, . . . , 2250 MHz for bands 71.125 to 75.875 GHz may be configured as follows. This method may be equally applied to bands of 60, 70, 80, 90, and 100 GHz. Further, the method may be applied to an FDD system used only for a band of 70 GHz and the case in which bands of 70 GHz and 80 GHz are used through FDD (at this time, the size of the FDD duplexer is 5 GHz).

1) Bandwidth of 250 MHz: a total of 19 bands at an interval of 250 MHz based on a channel raster of 71.250 GHz may be configured as the channel bandwidth. Two bandwidths in which the size of the FDD duplexer is larger than or equal to 2.5 GHz may be an FDD pair.

2) Bandwidth of 500 MHz: a total of 9 bands at an interval of 500 MHz based on a channel raster of 71.5 GHz, a total of 9 bands at an interval of 500 MHz based on a channel raster of 71.650 GHz, or a total of 9 bands at an interval of 500 MHz based on a channel raster of 71.8 GHz may be configured. Two bandwidths in which the size of the FDD duplexer is larger than or equal to 2.5 GHz may be an FDD pair.

3) Bandwidth higher than or equal to 750 MHz: a channel bandwidth may be configured as a sum of the bandwidths presented in 1) and 2).

The proposed method may be applied to a band higher than or equal to 70 GHz, in which case the channel raster may be configured as shown in [Table 7] below.

TABLE 7

| Frequency range | $\Delta F_{Global}$ | $F_{REF\text{-}Offs}$ [MHz] | $N_{REF\text{-}Offs}$ | Range of $N_{REF}$ |
|---|---|---|---|---|
| 0-3000 MHz | 5 kHz | 0 MHz | 0 | 0-599999 |
| 3000-24250 MHz | 15 kHz | 3000 MHz | 600000 | 600000-2016666 |
| 24250-70000 MHz | 60 kHz | 24250 MHz | 2016667 | 2016667-2779166 |
| 70000-100000 MHz | 125 kHz | 70000 MHz | 2779167 | 2779167-3019167 |

When the proposed method of configuring the channel raster is applied, the UE may receive an SSB in FRs 1, 2, and 3 on the basis of CP-OFDM, and preferentially search for an SSB in bands from 52.6 GHz to 70 GHz on the basis of CP-OFDM. When the UE fails in receiving the CP-OFDM SSB, the UE may search for the SSB on the basis of DFT-s-OFDM, and search for the SSB on the basis of DFT-s-OFDM in a band higher than or equal to 70 GHz. Further, the UE may search for a predetermined SSB in FR4, receive a MIB or a system information block (or system information) on the basis of the SSB, and then identify the type of a waveform used for each channel raster existing in each FR4, included in the system information. Additionally, the system information may include the type of a waveform used for each SSB index (understood as an identifier of the SSB) of the SSB existing in the channel raster in each FR4. When the UE initially receives the SSB on the basis of DFT-s-OFDM or CP-OFDM and then reports UE capability to the BS, the UE may insert the type of a waveform which the UE can receive and the type of a channel (for example, various data channels and control channels such as a PDCCH, a PDSCH, a physical uplink shared channel (PUSCH), and a physical uplink control channel (PUCCH)) or the type a waveform which the UE can receive and transmit for each type of a signal (for example, a DMRS, a CSI-RS, a PSS, or an SSS for the above-described channel) into the capability information and report the UE capability information. When the UE capability is reported to the BS, the UE may insert at least one of the type of the waveform or the channel which the UE can receive for each channel raster range and signal-related information into the capability information and report the capability information. The capability information may further include the type of a waveform which the UE can receive for each of the available frequency bands. For example, the UE may report, to the BS, the UE capability for receiving a downlink channel and/or a signal through CP-OFDM in a bandwidth up to 400 MHz and receiving a downlink channel and/or a signal through DFT-s-OFDM in a band higher than or equal to 400 MHz.

Figure 14A:
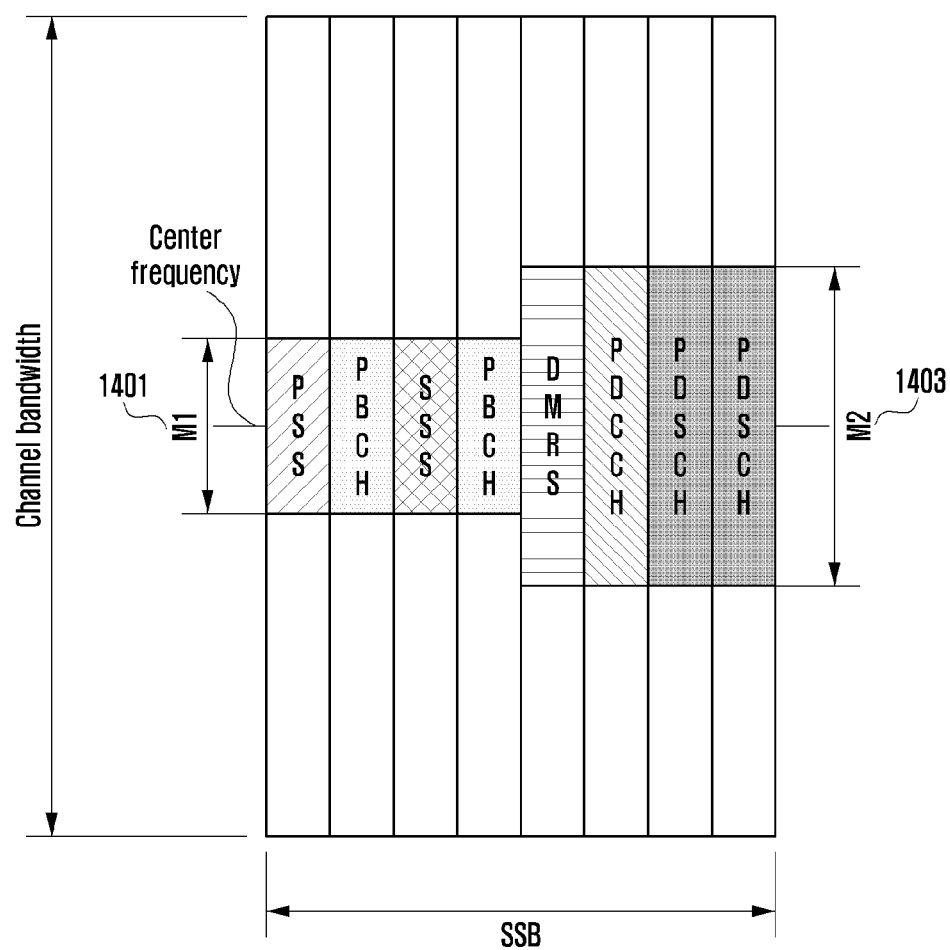
FIG. 14A illustrates a channel multiplexing method according to a twelfth embodiment proposed by the disclosure.

FIG. 14A illustrates a channel multiplexing method according to a thirteenth embodiment proposed by the disclosure. The twelfth embodiment is a method of transmitting first and second synchronization signals, a broadcasting channel for transmitting initial access system information, a reference signal, a control channel for transmitting additional system information, and a data channel not to overlap in the time symbol, in which case the signals and the channels are transmitted in a time division multiplexing (TDM) scheme unlike other embodiments in which the signals and the channels are transmitted in a frequency division multiplexing (FDM) scheme. Referring to FIG. 14A, in a 1400, first and second synchronization signals and a broadcast signal for initial access are transmitted in a first bandwidth 1401, and an additional broadcast signal is transmitted in a second bandwidth 1403. The second bandwidth 1403 has a center frequency that is the same as the first bandwidth 1401, and the size of the second bandwidth 1403 is larger than that of the first bandwidth 1401. The BS transmits the first and second synchronization signals and the broadcast signal for initial access in the first bandwidth 1401 and the additional broadcast signal in the second bandwidth 1403 through the second waveform.

Figure 14B:
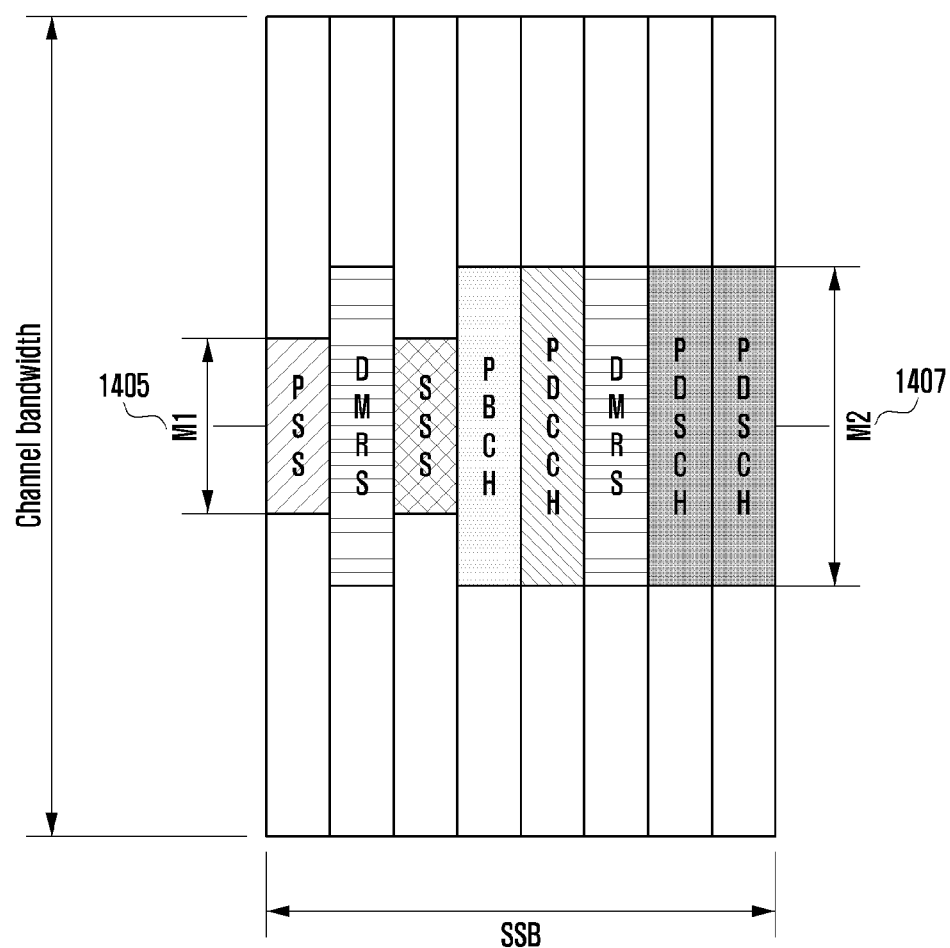
FIG. 14B illustrates another channel multiplexing method according to the twelfth embodiment proposed by the disclosure.

FIG. 14B illustrates another channel multiplexing method according to the thirteenth embodiment proposed by the disclosure. In another method, as illustrated in b 1410, the first synchronization signal and the second synchronization signal may be transmitted in a first bandwidth 1405, and the broadcast signal for initial access and the broadcast signal for additional system information may be transmitted in a second bandwidth 1407. The second bandwidth 1407 has a center frequency that is the same as the first bandwidth 1405, and the size of the second bandwidth 1407 is large than the size of the first bandwidth 1405. Further, a DMRS may be transmitted between the first synchronization signal and the second synchronization signal. The first synchronization signal and the second synchronization signal may be transmitted using the first waveform form or the second waveform, and the remaining channels and signals may be transmitted using the second waveform.

Figure 14C:
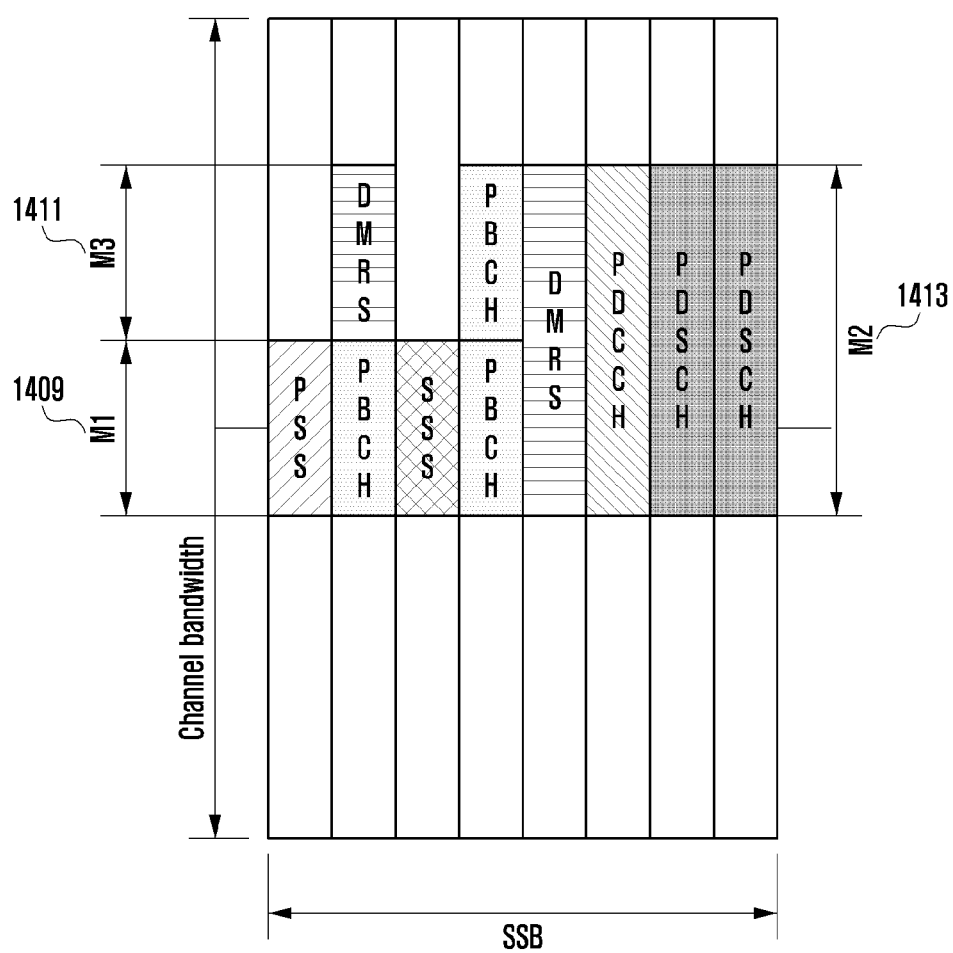
FIG. 14C illustrates another channel multiplexing method according to the twelfth embodiment proposed by the disclosure.

FIG. 14C illustrates another channel multiplexing method according to the twelfth embodiment proposed by the disclosure. Referring to c 1420, the first synchronization signal and the second synchronization signal are transmitted equally to b 1410. The broadcast signal for transmitting additional system information is transmitted in a second bandwidth 1413. The broadcast signal for initial access may be transmitted while occupying a bandwidth that is the same as the bandwidth (second bandwidth 1413) of the broadcast signal for transmitting additional system information in resources (a second symbol in the SSB) occupying the bandwidth that is the same as the first synchronization between the first synchronization signal and the second synchronization signal and in a symbol (a fourth symbol in the SSB) after the second synchronization signal, and the DMRS may be additionally transmitted in the second symbol in which the broadcast signal existing between the first synchronization signal and the second synchronization signal is transmitted. In this case, the DMRS may occupy a third bandwidth 1411, the broadcast signal may occupy a first bandwidth 1409, and the DMRS and the broadcast signal may occupy subcarrier resources that do not overlap in the time sample in each bandwidth. For example, different comb offsets may be applied to the DMRS and the broadcast signal.

Figure 15:
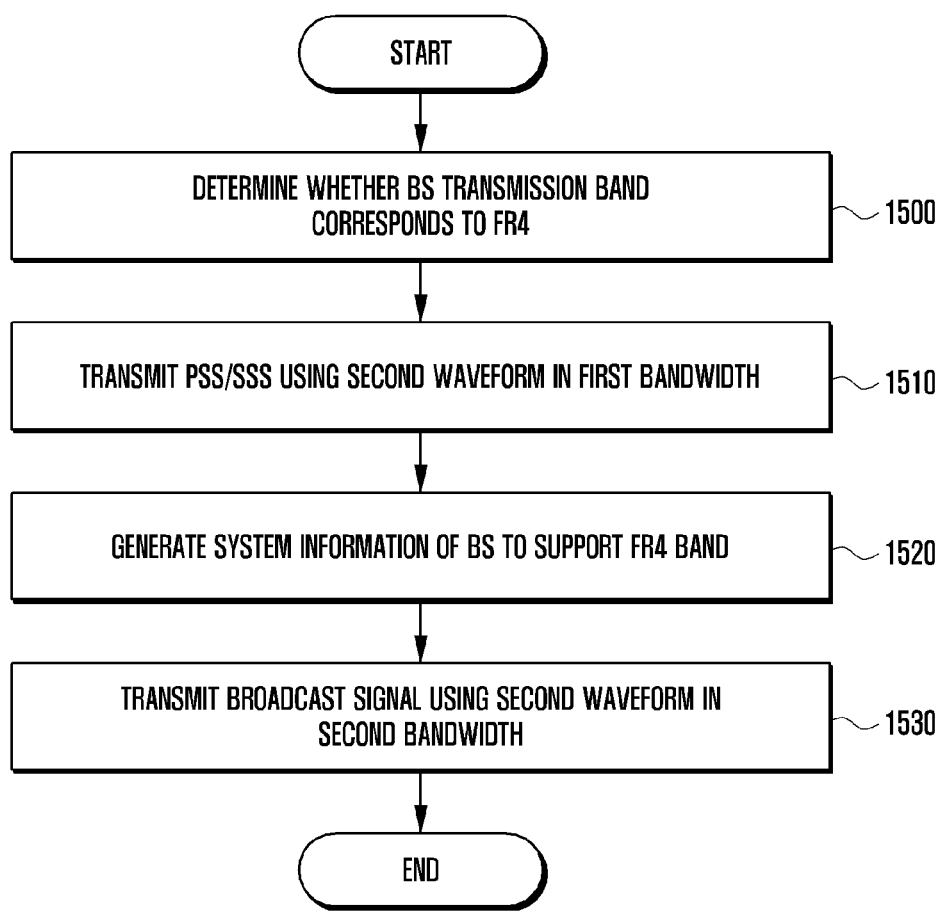
FIG. 15 illustrates an example of an operation for multiplexing an initial access channel in a millimeter band of the BS according to some embodiments of the disclosure.

FIG. 15 illustrates an example of an operation for multiplexing an initial access channel in a millimeter band of the BS according to some embodiments of the disclosure. Referring to FIG. 15, the BS determines whether an available bandwidth and a used bandwidth of a cell correspond to a band of FR4 in step 1500, and when the bandwidths correspond to the band of FR4, transmits a first synchronization signal (PSS) and a second synchronization signal (SSS) in a first bandwidth using the second waveform in step 1510. Thereafter, in step 1520, the BS generates system information of the BS for supporting the band of FR4. The generated system information is transmitted in a second bandwidth using the second waveform through a broadcast signal in step 1530.

Figure 16:
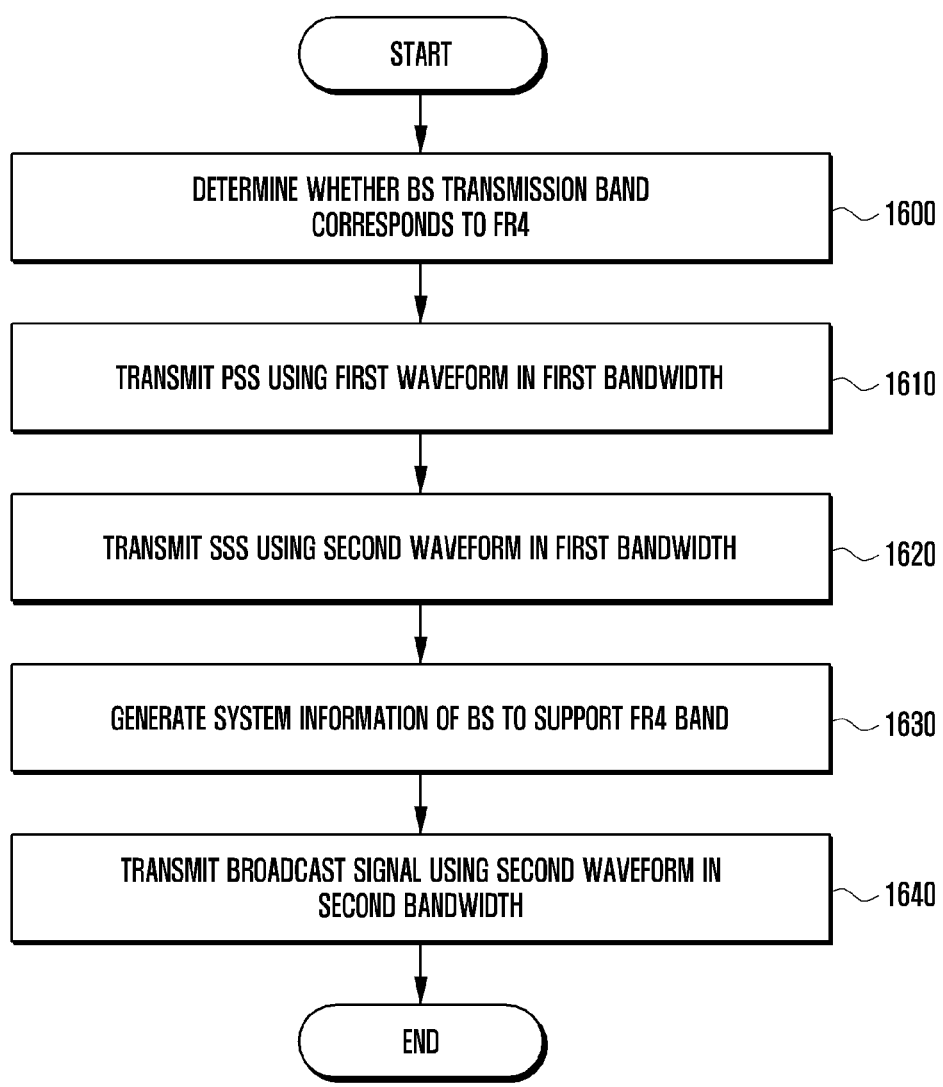
FIG. 16 illustrates an example of an operation of multiplexing an initial access channel in a millimeter band of the BS according to another embodiment of the disclosure.

FIG. 16 illustrates an example of an operation of multiplexing an initial access channel in a millimeter band of the BS according to another embodiment of the disclosure. Referring to FIG. 16, the BS determines whether an available bandwidth and a used bandwidth of a cell correspond to a band of FR4 in step 1600, and when the bandwidths correspond to the band of FR4, transmits a first synchronization signal (PSS) in a first bandwidth using the first waveform in step 1610. The BS transmits a second synchronization signal (SSS) in a first bandwidth using the second waveform in step 1620. Thereafter, in step 1630, the BS generates system information of the BS for supporting the band of FR4. The generated system information is transmitted in a second bandwidth using the second waveform through a broadcast signal in step 1640.

Figure 17:
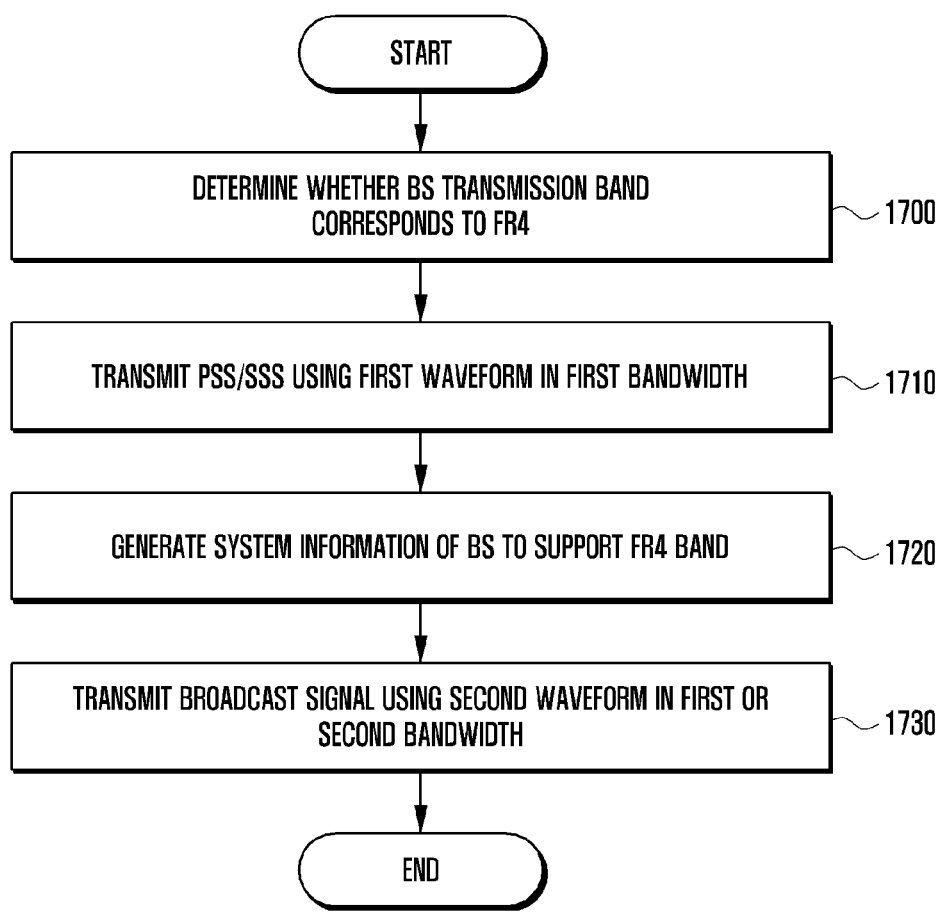
FIG. 17 illustrates an example of an operation of multiplexing an initial access channel in a millimeter band of the BS according to another embodiment of the disclosure.

FIG. 17 illustrates an example of an operation of multiplexing an initial access channel in a millimeter band of the BS according to another embodiment of the disclosure. Referring to FIG. 17, the BS determines whether an available bandwidth and a used bandwidth of a cell correspond to a band of FR4 in step 1700, and when the bandwidths correspond to the band of FR4, transmits a first synchronization signal (PSS) and a second synchronization signal (SSS) in a first bandwidth using the first waveform in step 1710. The BS generates system information of the BS for supporting the band of FR4 in step 1720, and the generated system information is transmitted in a first bandwidth or a second bandwidth using the second waveform through the broadcast signal in step 1730.

Figure 18:
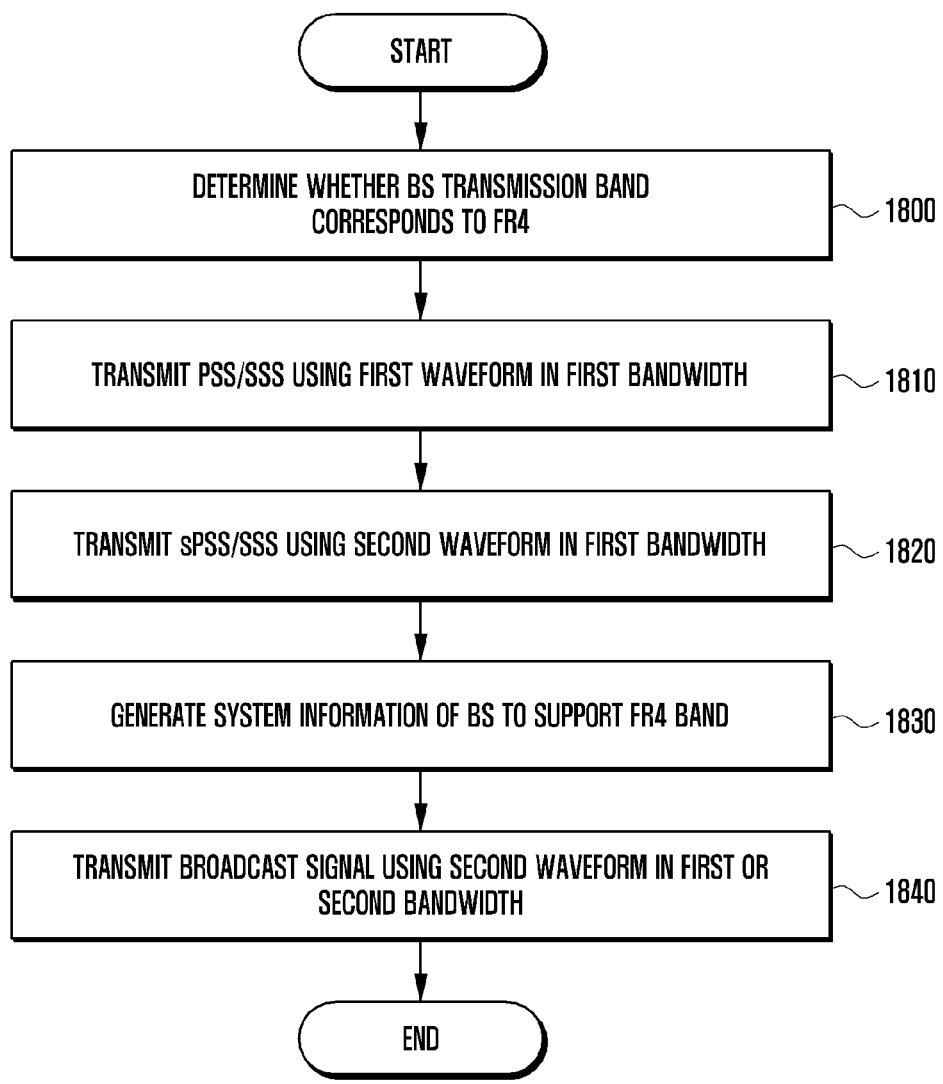
FIG. 18 illustrates an example of an operation for multiplexing an initial access channel in a millimeter band of the BS according to another embodiment of the disclosure.

FIG. 18 illustrates an example of an operation for multiplexing an initial access channel in a millimeter band of the BS according to another embodiment of the disclosure. The BS determines whether an available band and a used band of a cell correspond to a band of FR4 in step 1800. When the bandwidths correspond to the band of FR4, the BS transmits a first synchronization signal (PSS) and a second synchronization signal (SSS) in a first bandwidth using the first waveform in step 1810, and transmits a third synchronization signal (sPSS) and a fourth synchronization signal (sSSS) using the second waveform in step 1820. Thereafter, the BS generates system information of the BS for supporting the band of FR4 in step 1830, and the generated system information is transmitted in a first bandwidth or a second bandwidth using the second waveform through the broadcast signal in step 1840.

Figure 19:
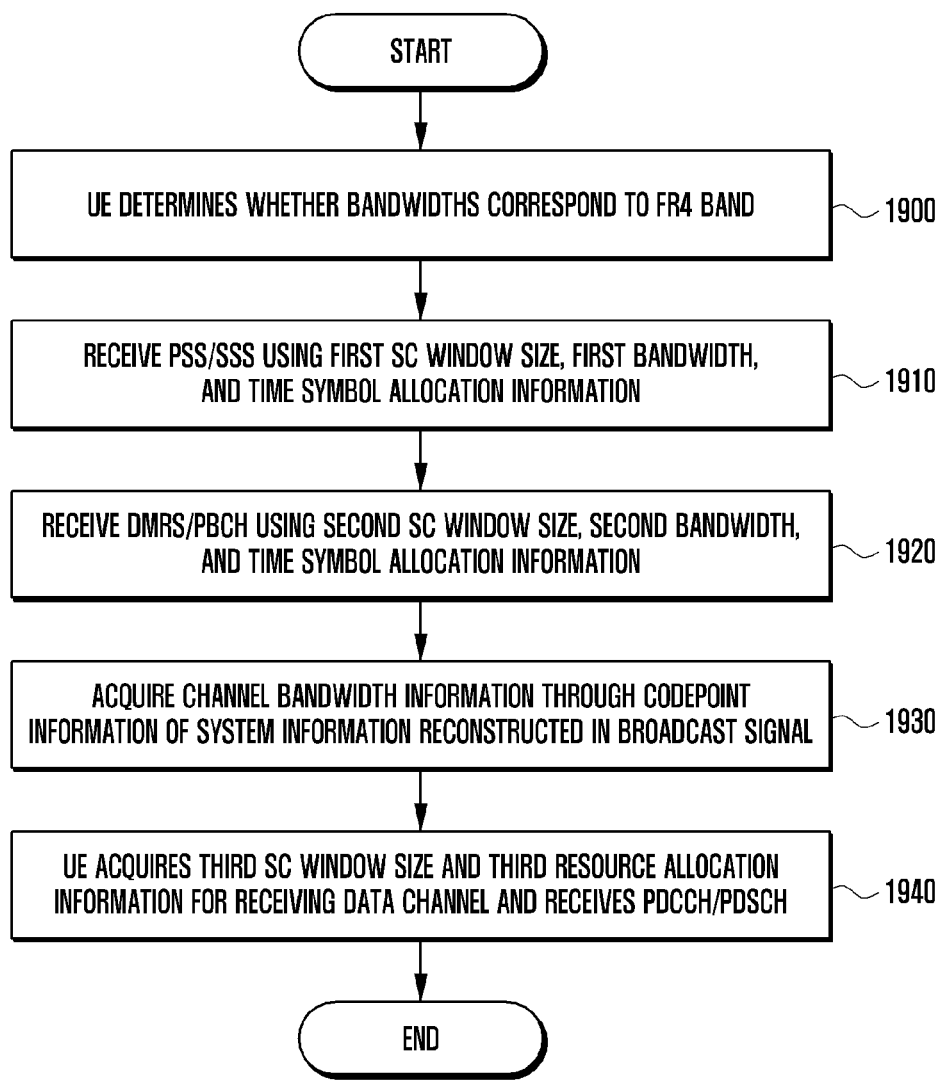
FIG. 19 illustrates an example of an operation in which the UE receives an initial access channel in a millimeter band of the BS according to an embodiment of the disclosure.

FIG. 19 illustrates an example of an operation in which the UE receives an initial access channel in a millimeter band of the BS according to an embodiment of the disclosure. Referring to FIG. 19, the UE determines whether an available bandwidth and a used bandwidth of a cell correspond to a band of FR4 in step 1900, and when the bandwidths correspond to the band of FR4, receives and reconstructs a first synchronization signal (PSS) and a second synchronization signal (SSS) using the predetermined first waveform in a first bandwidth on the basis of the length of a first synchronization signal (or the size of a second waveform bandwidth of the first bandwidth or the size of a first single carrier bandwidth (SC window) when the synchronization signal is transmitted using the second waveform) or/and time symbol allocation information of the synchronization signal in step 1910. In step 1920, the UE receives and reconstructs the broadcast signal using the predetermined second waveform in a second bandwidth on the basis of the size of a second waveform bandwidth of the second bandwidth of the broadcast signal or the size of a second single carrier bandwidth (SC window) size and/or time symbol allocation information of the broadcast signal. Thereafter, in step 1930, the UE acquires channel bandwidth (BW) information using a codepoint of the system information reconstructed in the broadcast signal. In step 1940, the UE acquires the size of a third SC bandwidth and/or third resource allocation information for receiving additional system information or a data channel (that may be a frequency of at least one of a PDCCH and a PDSCH and/or time resource allocation information for receiving additional system information or data) of the UE on the basis of the system information reconstructed in the broadcast signal, receives the PDCCH and the PDSCH, and acquires system information or data.

Figure 20:
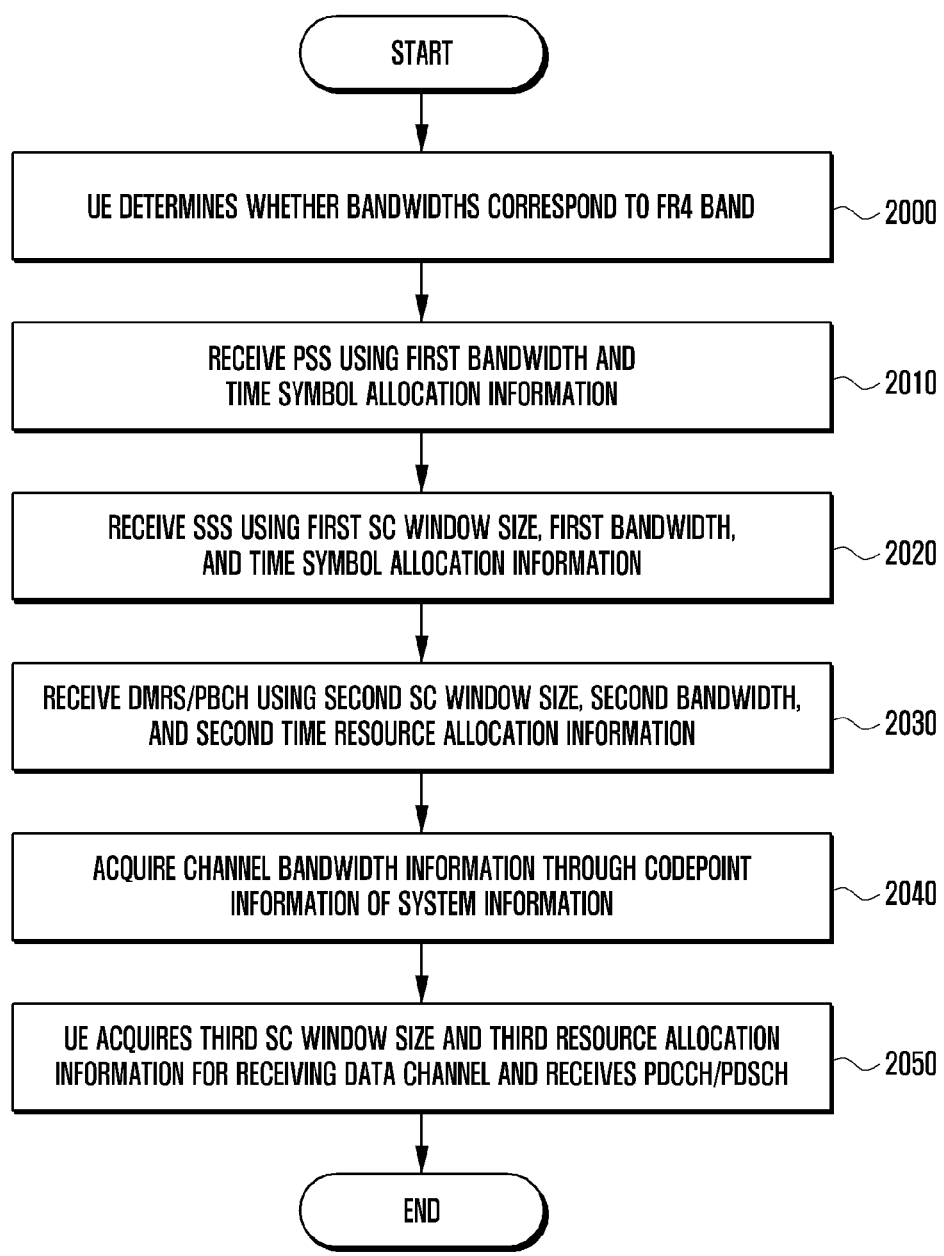
FIG. 20 illustrates an example of an operation in which the UE receives an initial access channel in a millimeter band of the BS according to an embodiment of the disclosure.

FIG. 20 illustrates an example of an operation in which the UE receives an initial access channel in a millimeter band of the BS according to an embodiment of the disclosure. Referring to FIG. 20, the UE determines whether an available bandwidth and a used bandwidth of a cell correspond to a band of FR4 in step 2000, and when the bandwidths correspond to the band of FR4, receives and reconstructs a first synchronization signal (PSS) using the first waveform in a first bandwidth on the basis of time symbol allocation information in step 2010. Further, the UE receives and reconstructs a second synchronization signal (SSS) using the predetermined second waveform in the first bandwidth on the basis of the length of the second synchronization signal (the size of a second waveform bandwidth of the first bandwidth or the size of a first single carrier bandwidth (SC window)) or/and time symbol allocation information in step 2020. The UE receives and reconstructs a broadcast signal using the predetermined second waveform in a second bandwidth on the basis of the size of a single carrier bandwidth (SC window) of the broadcast signal or/and time symbol allocation information in step 2030. Thereafter, in step 2040, the UE acquires channel bandwidth (BW) information using a codepoint of the system information reconstructed in the broadcast signal. Further, the UE acquires the size of a third single carrier bandwidth or/and third resource allocation information for receiving additional system information or a data channel (that may be a frequency of at least one of a PDCCH and a PDSCH and/or time resource allocation information for receiving additional system information or data) on the basis of the system information reconstructed in the broadcast signal, receives the PDCCH and the PDSCH, and acquires system information or the data channel.

Figure 21:
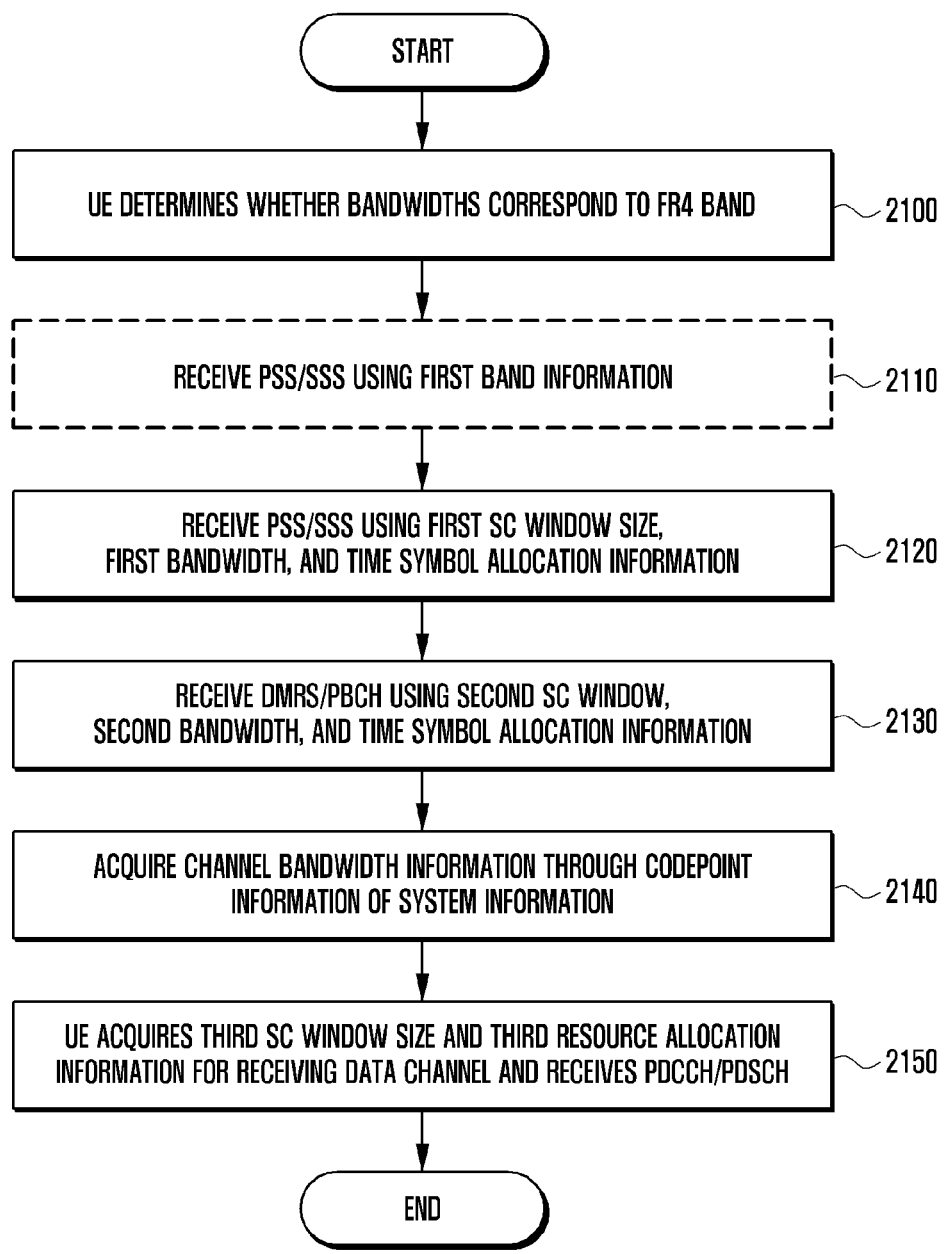
FIG. 21 illustrates an example of an operation in which the UE receives an initial access channel in a millimeter band of the BS according to an embodiment of the disclosure.

FIG. 21 illustrates an example of an operation in which the UE receives an initial access channel in a millimeter band of the BS according to an embodiment of the disclosure. Referring to FIG. 21, the UE determines whether an available bandwidth and a used bandwidth of a cell correspond to a band of FR4 in step 2100, and when the bandwidths correspond to the band of FR4, receives and reconstructs a first synchronization signal (PSS) and a second synchronization signal (SSS) using the predetermined first waveform in a first bandwidth on the basis of time symbol allocation information in step 2110. Step 2110 may be omitted. The UE receives and reconstructs the first synchronization signal (PSS) and the second synchronization signal (SSS) using the predetermined second waveform in the first bandwidth on the basis of the length of the first synchronization signal (that may be the size of a first single carrier bandwidth or the size of a second waveform bandwidth according to the first bandwidth) and time symbol allocation information in step 2120. In step 2130, the UE receives and reconstructs a broadcast signal using the predetermined second waveform in a second bandwidth on the basis of the size of a single carrier bandwidth of the broadcast signal (that may be the size of a second waveform bandwidth according to the second bandwidth or a second single carrier bandwidth) or/and time symbol allocation information. Thereafter, in step 2140, the UE acquires channel bandwidth (BW) information using a codepoint of the system information reconstructed in the broadcast signal. Further, the UE acquires the size of a third single carrier bandwidth or/and third resource allocation information for receiving additional system information or a data channel (that may be a frequency of at least one of a PDCCH and a PDSCH and/or time resource allocation information for receiving additional system information or data) on the basis of the system information reconstructed in the broadcast signal, receives the PDCCH and the PDSCH, and acquires system information or the data channel in step 2150.

Figure 22:
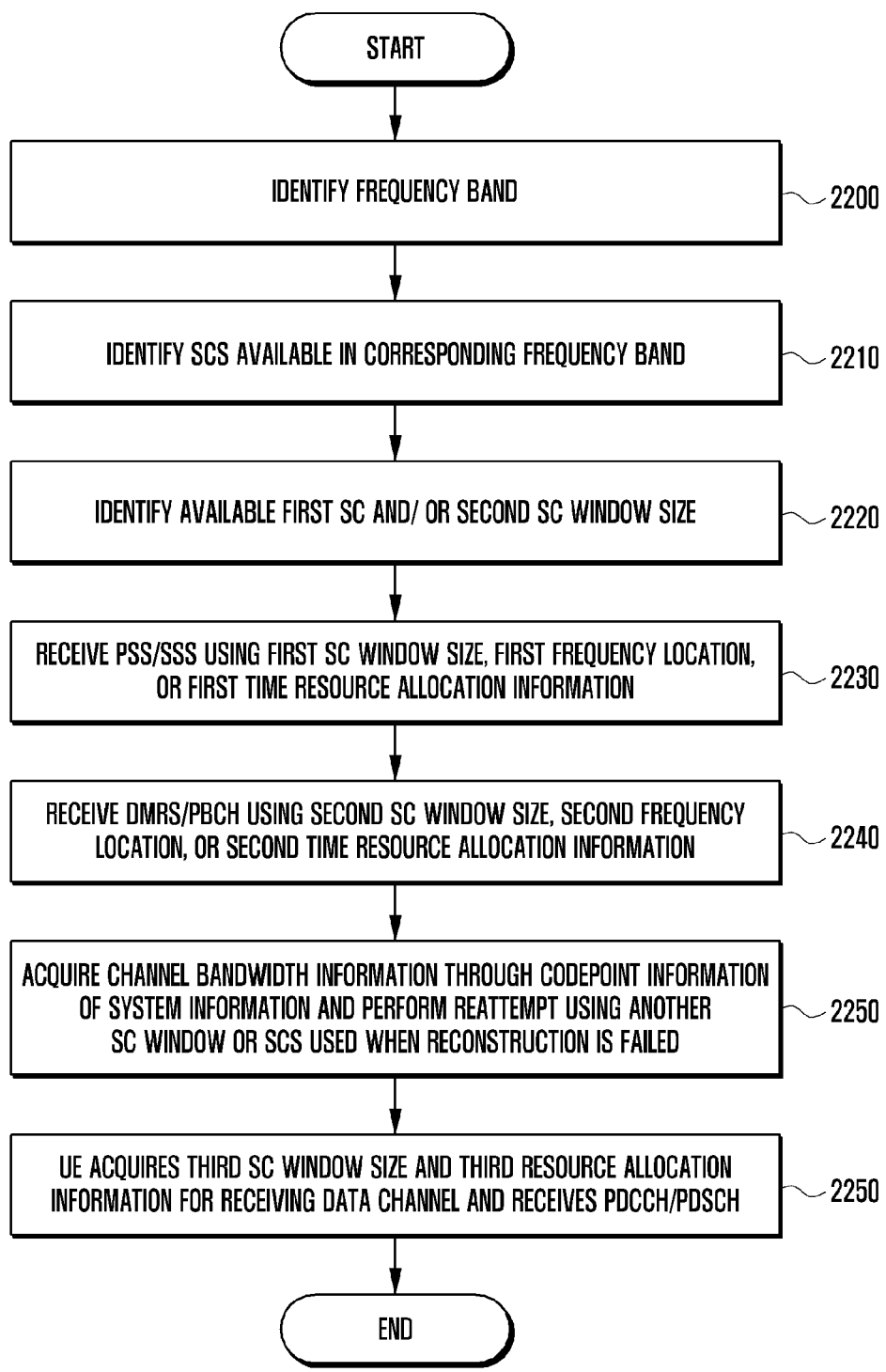
FIG. 22 illustrates an example of an operation in which the UE receives an initial access channel in a millimeter band of the BS according to an embodiment of the disclosure.

FIG. 22 illustrates an example of an operation in which the UE receives an initial access channel in a millimeter band of the BS according to an embodiment of the disclosure. Referring to FIG. 22, the UE determines whether an available bandwidth and a used bandwidth of a cell correspond to a band of FR4 in step 2200, and when the bandwidths correspond to the band of FR4, identifies available subcarrier spacing (SCS) in the corresponding frequency band in step 2210. Thereafter, the UE acquires the size of a first bandwidth (that may be the same as a first single carrier bandwidth) and the size of a second bandwidth (that may be the same as a second single carrier bandwidth) of the first waveform that can be applied to subcarrier spacing in step 2220. Thereafter, the UE receives and reconstructs a first synchronization signal (PSS) and a second synchronization signal (SSS) using the predetermined first waveform in the first bandwidth on the basis of first time symbol allocation information (that may be information on the PSS and the SSS) in step 2230. In step 2240, the UE receives and reconstructs the broadcast signal using the predetermined second waveform in a second bandwidth on the basis of the size of a single carrier bandwidth of the broadcast signal (corresponding to the size of a second single carrier bandwidth) or/and second time symbol allocation information (that may be information on a DMRS and the broadcast signal). Thereafter, in step 2250, the UE acquires channel bandwidth (BW) information using a codepoint of the system information reconstructed in the broadcast signal. Further, in step 2240, the UE acquires the size of a third single carrier bandwidth or/and third resource allocation information for receiving additional system information or a data channel (that may be a frequency of at least one of a PDCCH and a PDSCH and/or time resource allocation information for receiving additional system information or data) on the basis of the system information reconstructed in the broadcast signal, receives the PDCCH and the PDSCH, and acquires system information or the data channel.

When the UE fails in reconstructing the broadcast signal or cannot acquire the system information in step 2240, the UE attempts again reconstruction of the synchronization signal and the broadcast signal in the corresponding band using the size of another available SCS, another first single carrier bandwidth, or a second single carrier bandwidth.

All steps of the above-described method do not have to be performed, some steps of a plurality of methods may be combined and performed, and orders of the steps may be changed.

Figure 23:
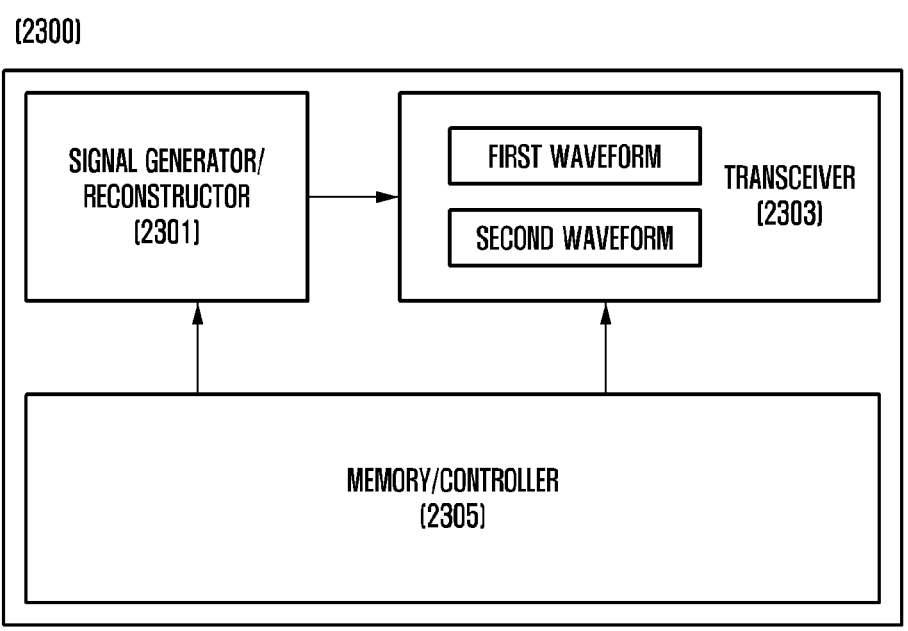
FIG. 23 illustrates a BS apparatus capable of executing embodiments of the disclosure.

FIG. 23 illustrates a BS apparatus capable of executing embodiments of the disclosure. ABS apparatus 2300 may include a signal generator/reconstructor 2301, a memory, and a controller 2305, and a transceiver 2303 may transmit and receive a signal to and from the UE. The signal may include control information, a reference signal, and data. To this end, the transceiver 2303 may include an RF transmitter for up-converting and amplifying a frequency of a transmitted signal and an RF receiver for low-noise amplifying a received signal and down-converting the frequency. The signal generator/reconstructor 2301 may reconstruct a signal from a baseband signal received by the transceiver 2303 or encode a data symbol, output the baseband signal to the controller 2305, and transmit the signal output from the controller 2305 through a radio channel. The signal generation unit may frequency or time-selectively configure baseband signals of the first waveform and the second waveform and transmit the baseband signals to the transceiver. The controller 2305 may control a series of processes to make the BS operate according to the embodiments of the disclosure.

Figure 24:
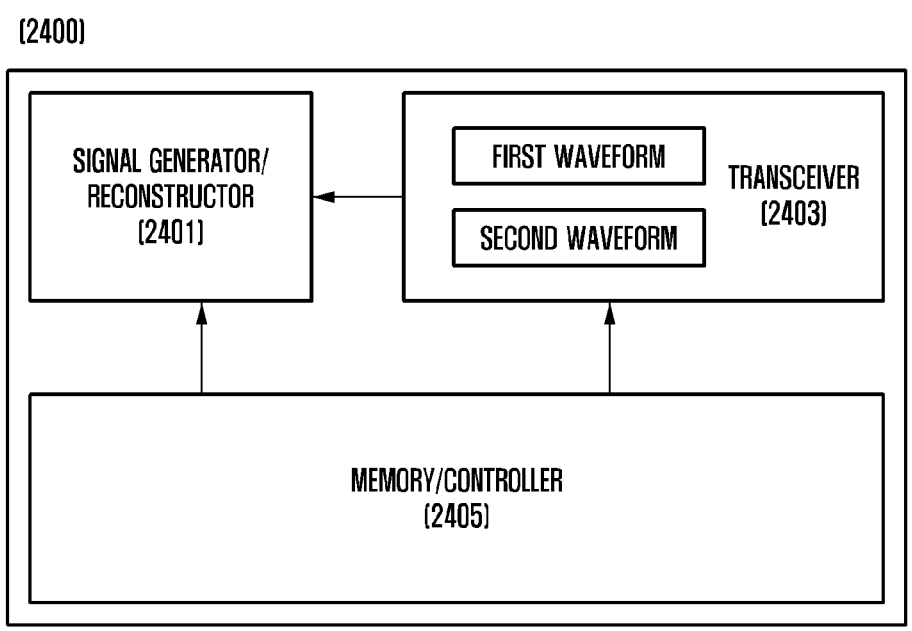
FIG. 24 illustrates a UE apparatus capable of performing embodiments of the disclosure.

FIG. 24 illustrates a UE apparatus capable of performing embodiments of the disclosure. A UE apparatus 2400 may include a transceiver 2403, a memory/controller 2405, and a signal generator/reconstructor 2401, and the transceiver 2403 may transmit and receive a signal to and from the BS. The signal may include control information, a reference signal, and data. To this end, the transceiver 2403 may include an RF transmitter for up-converting and amplifying a frequency of a transmitted signal and an RF receiver for low-noise amplifying a received signal and down-converting the frequency. The signal generator/reconstructor 2401 may reconstruct a baseband signal transmitted from the transceiver 2403 to predetermined information or data on the basis of the first waveform or the second waveform through control channel information, or attempt the reconstruction on the basis of both the first waveform and the second waveform and, if the reconstruction is successful, identify waveform information of the signal as the assumed waveform. Further, the transceiver may receive a signal through a radio channel, output the signal to the controller 2405, and transmit the signal output from the controller 2405 through a radio channel. The controller 2405 may control a series of processes to make the UE operate according to the aforementioned embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of transmitting a synchronization signal block (SSB) by a base station (BS) in a wireless communication system, the method comprising:
   identifying whether a bandwidth of a cell controlled by the BS corresponds to a first frequency band; and
   in case that the bandwidth of the cell corresponds to the first frequency band, transmitting the SSB,
   wherein the SSB comprises a primary synchronization signal (PSS), a secondary synchronization signal (SSS), and a physical broadcast channel (PBCH) for transmitting system information for an initial access,
   wherein the PSS and the SSS are transmitted using a single-carrier waveform or a multi-carrier waveform in a first bandwidth,
   wherein in case that the first frequency band corresponds to a first frequency range, the PBCH is transmitted using the single-carrier waveform in a second bandwidth, and in case that the first frequency band corresponds to a second frequency range having lower frequency than the first frequency range, the PBCH is transmitted using the multi-carrier waveform in the second bandwidth, and
   wherein the multi-carrier waveform corresponds to a cyclic prefix-orthogonal frequency division multiplexing (CP-OFDM).

2. The method of claim 1, wherein the second bandwidth is equal to or wider than the first bandwidth.

3. The method of claim 1, wherein a center frequency of the first bandwidth and a center frequency of the second bandwidth is the same, or
   wherein a lowest frequency of the first bandwidth and a lowest frequency of the second bandwidth is the same.

4. The method of claim 1, wherein the transmitting of the SSB comprises:
   transmitting a physical downlink control channel (PDCCH) scheduling a physical downlink shared channel (PDSCH) for additional system information and the PDSCH carrying the additional system information,
   wherein the SSB and the PDCCH and the PDSCH are time-division multiplexed (TDMed), and
   wherein the PSS, the SSS and the PBCH are transmitted using the single-carrier waveform.

5. The method of claim 4, wherein the PDCCH and the PDSCH are transmitted using the single-carrier waveform in a third bandwidth, and
   wherein the third bandwidth is wider than the second bandwidth.

6. A method of receiving a synchronization signal block (SSB) by a user equipment (UE) in a wireless communication system, the method comprising:
   identifying whether a bandwidth of a cell transmitting the SSB which the UE desires to receive corresponds to a first frequency band;
   in case that the bandwidth of the cell corresponds to the first frequency band, receiving the SSB; and
   acquiring synchronization, based on the received SSB and acquiring system information for an initial access,
   wherein the SSB comprises a primary synchronization signal (PSS), a secondary synchronization signal (SSS), and a physical broadcast channel (PBCH) for receiving the system information for an initial access,
   wherein the PSS and the SSS are received using a single carrier waveform or a multi-carrier waveform in a first bandwidth,
   wherein in case that the first frequency band corresponds to a first frequency range, the PBCH is received using the single carrier waveform in a second bandwidth, and in case that the first frequency band corresponds to a second frequency range having lower frequency than the first frequency range, the PBCH is received using the multi-carrier waveform in the second bandwidth, and
   wherein the multi-carrier waveform corresponds to a cyclic prefix-orthogonal frequency division multiplexing (CP-OFDM).

7. The method of claim 6, wherein the second bandwidth is equal to or wider than the first bandwidth.

8. The method of claim 6, wherein a center frequency of the first bandwidth and a center frequency of the second bandwidth is the same, or
   wherein a lowest frequency of the first bandwidth and a lowest frequency of the second bandwidth is the same.

9. The method of claim 6, wherein the receiving of the SSB comprises:
   receiving a physical downlink control channel (PDCCH) scheduling a physical downlink shared channel (PDSCH) for additional system information and the PDSCH carrying the additional system information,
   wherein the SSB and the PDCCH and the PDSCH are time-division multiplexed (TDMed), and
   wherein the PSS, the SSS and the PBCH are received using the single carrier waveform.

10. The method of claim 9, wherein the PDCCH and the PDSCH are transmitted using the single carrier waveform in a third bandwidth, and
    wherein the third bandwidth is wider than the second bandwidth.

11. A base station (BS) for transmitting a synchronization signal block (SSB) in a wireless communication system, the BS comprising:
    a transceiver; and
    a controller coupled to the transceiver and configured to:
    identify whether a bandwidth of a cell controlled by the BS corresponds to a first frequency band and, in case that the bandwidth of the cell corresponds to the first frequency band, transmit the SSB, wherein the SSB comprises a primary synchronization signal (PSS), a secondary synchronization signal (SSS), and a physical broadcast channel (PBCH) for transmitting system information for an initial access, wherein the PSS and the SSS are transmitted using a single carrier waveform or a multi-carrier waveform in a first bandwidth, wherein in case that the first frequency band corresponds to a first frequency range, the PBCH is transmitted using the single carrier waveform in a second bandwidth, and in case that the first frequency band corresponds to a second frequency range having lower frequency than the first frequency range, the PBCH is transmitted using the multi-carrier waveform in the second bandwidth, and wherein the multi-carrier waveform corresponds to a cyclic prefix-orthogonal frequency division multiplexing (CP-OFDM).

12. The BS of claim 11, wherein the second bandwidth is equal to or wider than the first bandwidth.

13. The BS of claim 11, wherein a center frequency of the first bandwidth and a center frequency of the second bandwidth is the same, or wherein a lowest frequency of the first bandwidth and a lowest frequency of the second bandwidth is the same.

14. The BS of claim 11, wherein the controller is further configured to transmit a physical downlink control channel (PDCCH) scheduling a physical downlink shared channel (PDSCH) for additional system information and the PDSCH carrying the additional system information, wherein the SSB and the PDCCH and the PDSCH are time-division multiplexed (TDMed), and wherein the PSS, the SSS and the PBCH are transmitted using the single carrier waveform.

15. The BS of claim 14, wherein the PDCCH and the PDSCH are transmitted using the single carrier waveform in a third bandwidth, and wherein the third bandwidth is wider than the second bandwidth.

16. A user equipment (UE) for receiving a synchronization signal block (SSB) in a wireless communication system, the UE comprising:

a transceiver; and a controller coupled to the transceiver and configured to:

perform control to identify whether a bandwidth of a cell transmitting the SSB which the UE desires to receive corresponds to a first frequency band, in case that the bandwidth of the cell corresponds to the first frequency band, receive the SSB, and acquire synchronization, based on the received SSB and acquire system information for an initial access, wherein the SSB comprises a primary synchronization signal (PSS), a secondary synchronization signal (SSS), and a physical broadcast channel (PBCH) for receiving the system information for an initial access, wherein the PSS and the SSS are received using a single-carrier waveform or a multi-carrier waveform in a first bandwidth, wherein in case that the first frequency band corresponds to a first frequency range, the PBCH is received using the single-carrier waveform in a second bandwidth, and in case that the first frequency band corresponds to a second frequency range having lower frequency than the first frequency range, the PBCH is received using the multi-carrier waveform in the second bandwidth, and wherein the multi-carrier waveform corresponds to a cyclic prefix-orthogonal frequency division multiplexing (CP-OFDM).

17. The UE of claim 16, wherein the second bandwidth is equal to or wider than the first bandwidth.

18. The UE of claim 16, wherein a center frequency of the first bandwidth and a center frequency of the second bandwidth is the same, or wherein a lowest frequency of the first bandwidth and a lowest frequency of the second bandwidth is the same.

19. The UE of claim 16, wherein the controller is further configured to receive a physical downlink control channel (PDCCH) scheduling a physical downlink shared channel (PDSCH) for additional system information and the PDSCH carrying the additional system information, wherein the SSB and the PDCCH and the PDSCH are time-division multiplexed (TDMed), and wherein the PSS, the SSS and the PBCH are received using the single-carrier waveform.

20. The UE of claim 19, wherein the PDCCH and the PDSCH are transmitted using the single-carrier waveform in a third bandwidth, and wherein the third bandwidth is wider than the second bandwidth.

* * * * *